US012756601B2

(12) United States Patent
Balakrishnan et al.

(10) Patent No.: US 12,756,601 B2
(45) Date of Patent: Oct. 6, 2026

(54) CANCELLATION PULSE GENERATION WITH REDUCED WAVEFORM STORAGE TO REDUCE CRESTS IN TRANSMISSION SIGNALS

(71) Applicant: Texas Instruments Incorporated, Dallas, TX (US)

(72) Inventors: Jaiganesh Balakrishnan, Bangalore (IN); Aswath VS, Kannur (IN); Sriram Murali, Bangalore (IN); Sreenath Narayanan Potty, Bangalore (IN); Raju Kharataram Chaudhari, Bangaluru (IN); Kapil Kumar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/651,130

(22) Filed: Apr. 30, 2024

(65) Prior Publication Data

US 2025/0047531 A1 Feb. 6, 2025

(30) Foreign Application Priority Data

Jul. 28, 2023 (IN) ............................ 202341051095

(51) Int. Cl.
*H04L 25/03* (2006.01)
*H04L 27/26* (2006.01)

(52) U.S. Cl.
CPC .... *H04L 25/03343* (2013.01); *H04L 27/2614* (2013.01)

(58) Field of Classification Search
CPC ............ G11C 7/1057; H04L 25/03343; H04L 27/2614; H11C 7/1048
See application file for complete search history.

(56) References Cited

U.S. PATENT DOCUMENTS 6,460,127 B1 * 10/2002 Akerib ................ G06F 15/8038 712/18
6,476,810 B1 * 11/2002 Simha ..................... G06F 17/18 345/582
8,446,979 B1 * 5/2013 Yee ....................... H03F 1/3258 375/295

(Continued)

OTHER PUBLICATIONS

Texas Instruments Incorporated, "AFE77xxD Quad/Dual-Channel RF Transceiver With Dual Feedback Paths Integrating CFR/DPD," Datasheet, Jul. 2023—revised Oct. 2023, 12 pages.

*Primary Examiner* — Dac V Ha
(74) *Attorney, Agent, or Firm* — Xianghui Huang; Chuck F. Koch

(57) ABSTRACT

An example apparatus described herein to implement cancellation pulse generation includes a first memory storing first subsets of data samples of a single pulse cancellation waveform. The example apparatus includes a second memory storing second subsets of data samples of the single pulse cancellation waveform, the second subsets including different data samples of the single pulse cancellation waveform than the first subsets. The example apparatus includes first circuitry coupled to the first memory and to the second memory in parallel. The example apparatus includes a plurality of buffers. The example apparatus includes second circuitry coupled to the plurality of buffers.

20 Claims, 17 Drawing Sheets

(56) References Cited

U.S. PATENT DOCUMENTS

| | | | | |
|---|---|---|---|---|
| 8,761,916 | B2 * | 6/2014 | Letunovskiy | G10L 25/90<br>379/386 |
| 2014/0044215 | A1 * | 2/2014 | Mundarath | H04L 27/2624<br>375/297 |
| 2014/0086356 | A1 * | 3/2014 | Azadet | H04L 27/2623<br>375/295 |
| 2024/0220445 | A1 * | 7/2024 | Rajamani | H04L 25/03343 |

* cited by examiner

1050

PEAK DETECTED AT PHASE0 1054 (n = 1)

PEAK DETECTED AT PHASE1 1060 (n = 5)

PEAK DETECTED AT PHASE0 1066 (n = 11)

| | n | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| CANCELLATION PULSE INDEX GENERATOR OUTPUT; 1056 | m1 | | | 0 | 4 | 8 | 12 | 16 | 20 | 24 | 28 | 32 | 36 | 40 | 44 | 48 | 52 | 56 | 60 | 64 | 68 |
| 1062 | m2 | | | | | | | 1 | 5 | 9 | 13 | 17 | 21 | 25 | 29 | 33 | 37 | 41 | 45 | 49 | 53 |
| | m3 | | | | | | | | | | | | | 0 | 4 | 8 | 12 | 16 | 20 | 24 | 28 |
| | m4 | | | | | | | | | | | | | | | | | | | | |
| | m5 | | | | | | | | | | | | | | | | | | | | |
| | m6 | | | | | | | | | | | | | | | | | | | | |
| MEMORY ACCESS CONTROLLER OUTPUT 1052 | k1 | | | 0 | | | | 1 | | 4 | | | | 5 | 0 | | | | | | |
| | k2 | | | | 0 | | | | 1 | | 4 | | | | 5 | 0 | | | | | |
| | k3 | | | | | 0 | | | | 1 | | 4 | | | | 5 | 0 | | | | |
| | k4 | | | | | | 0 | | | | 1 | | 4 | | | | 5 | 0 | | | |
| | k5 | | | | | | | 0 | | | | 1 | | 4 | | | | 5 | 0 | | |
| | k6 | | | | | | | | 0 | | | | 1 | | 4 | | | | 5 | 0 | |
| FIFO1In | | | | h(0) | h(4) | h(8) | h(12) | h(16) | h(20) | h(24) | h(28) | h(32) | h(36) | h(40) | h(44) | h(48) | • | • | • | • | • |
| FIFO1Out | | | | | | | | | | h(0) | h(4) | h(8) | h(12) | h(16) | h(20) | h(24) | h(28) | • | • | • | • |
| FIFO2In | | | | | | | | h(1) | h(5) | h(9) | h(13) | h(17) | h(21) | h(25) | h(29) | • | • | • | • | • | • |
| FIFO2Out | | | | | | | | | | | | | | h(1) | h(5) | h(9) | h(13) | h(17) | h(21) | h(25) | h(29) |
| FIFO3In | | | | | | | | | | | | | | | h(0) | h(4) | h(8) | h(12) | h(16) | h(20) | h(24) |
| FIFO3Out | | | | | | | | | | | | | | | | | | | | h(0) | h(4) |

$\delta = 6 = P$ 1058 (n = 2 to 8)

$\delta = 6$ 1064 (n = 6 to 12)

$\delta = 5$ 1068 (n = 13 to 18)

FIG. 10B

CANCELLATION PULSE GENERATION WITH REDUCED WAVEFORM STORAGE TO REDUCE CRESTS IN TRANSMISSION SIGNALS

CROSS-REFERENCE TO RELATED APPLICATION

This patent application claims the benefit of and priority to Indian Provisional Patent Application Serial No. 202341051095 filed Jul. 28, 2023, which application is hereby incorporated herein by reference in its entirety.

FIELD OF THE DISCLOSURE

This disclosure relates generally to transmitters and, more particularly, to cancellation pulse generation with reduced waveform storage to reduce crests in transmission signals.

BACKGROUND

Wireless communications technology enables a wide variety of electronic devices (e.g., mobile phones, tablets, laptops, etc.) to support the execution of increasingly diverse and complex workloads. The secure, efficient, and accurate exchange of information over a wireless medium includes technical challenges. One such technical challenge is low efficiency of the power amplifier. In general, the efficiency of a power amplifier decreases as the amplitude of its output signal increases.

SUMMARY

For methods and apparatus to implement cancellation pulse generation, an example includes a first memory storing first subsets of data samples of a single pulse cancellation waveform. The example apparatus includes a second memory storing second subsets of data samples of the single pulse cancellation waveform, the second subsets including different data samples of the single pulse cancellation waveform than the first subsets. The example apparatus includes first circuitry configured to access a first data sample from the first memory and a second data sample from the second memory in parallel. The example apparatus includes a plurality of buffers associated respectively with a plurality of output cancellation pulses to be generated. The example apparatus includes second circuitry configured to provide the first data sample and the second data sample to one or more of the plurality of buffers.

For methods and apparatus to implement cancellation pulse generation, another example apparatus includes a plurality of memories, respective ones of the memories storing respective different subsets of data samples of a single pulse cancellation waveform, a total number of the memories based on a total number of output cancellation pulses capable of being generated, the respective ones of the memories to have respective storage capacities based on a ratio of a total number of samples of the single pulse cancellation waveform to the total number of output cancellation pulses capable of being generated. The example apparatus includes programmable circuitry configured to access individual data samples from the respective ones of the memories in parallel, generate one or more output cancellation pulses based on the accessed individual data samples and combine an input signal with the one or more output cancellation pulses to generate an output signal to be transmitted.

For methods and apparatus to implement cancellation pulse generation, an example non-transitory computer-readable medium includes computer-readable instructions to cause at least one processor circuit to at least obtain indices corresponding to samples of a pulse cancellation waveform to be used to generate one or more output cancellation pulses, the indices based on one or more locations of one or more peaks of an input signal, access individual data samples from respective ones of a plurality of memories in parallel based on the indices, the plurality of memories collectively storing a single instance of the pulse cancellation waveform, respective ones of the memories storing respective different subsets of data samples of a pulse cancellation waveform, the respective ones of the memories having respective storage capacities that are smaller than a total number of samples of the single instance of the pulse cancellation waveform, and generate the one or more output cancellation pulses based on the accessed individual data samples.

BRIEF DESCRIPTION OF THE DRAWINGS

FIG. 10B illustrates an example operation of the cancellation pulse generation circuitry of FIG. 9 based on the example partitioning of FIG. 10A.

Figure 1:
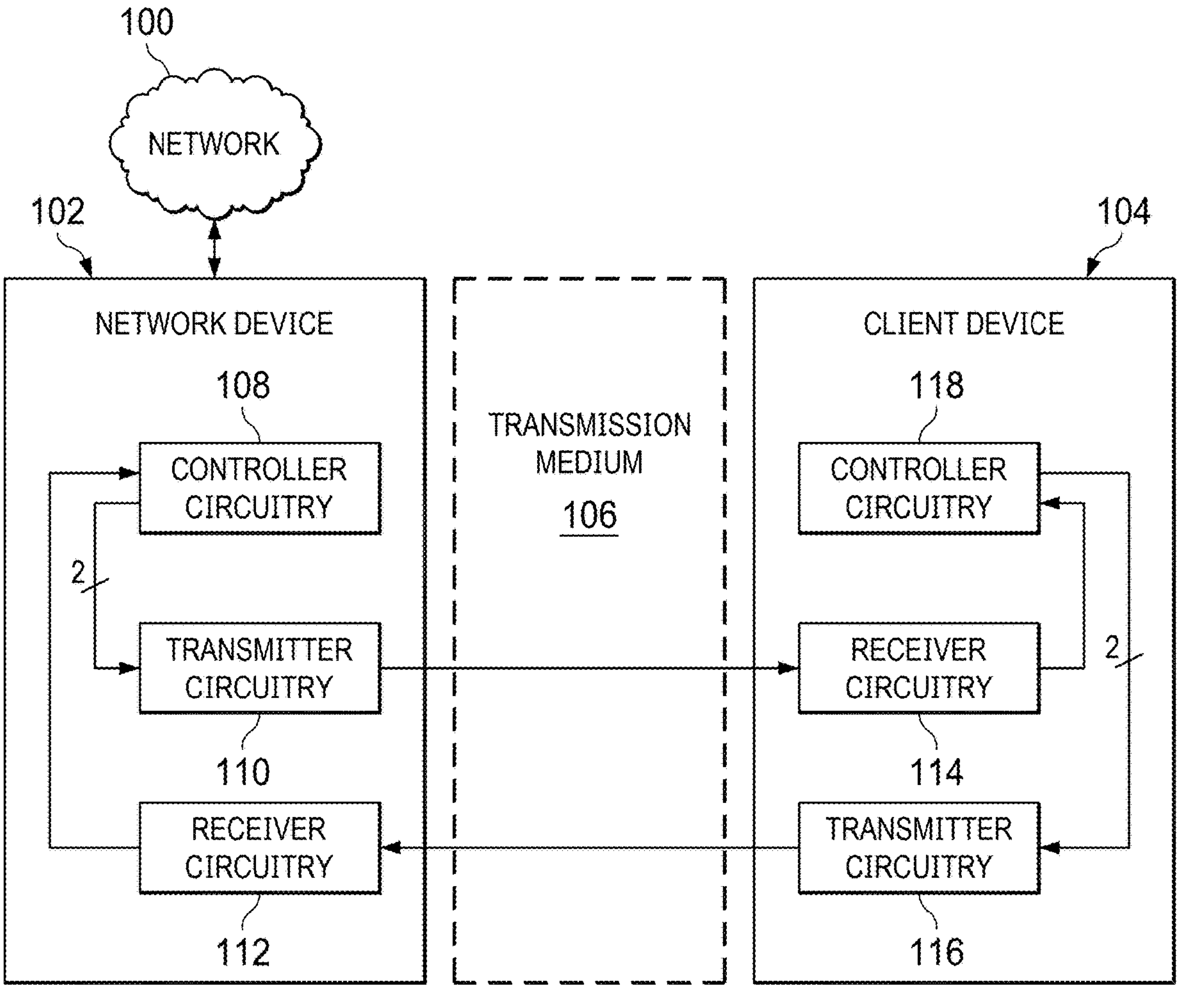
FIG. 1 is a block diagram of an example communication system including a client device and a base station.

The drawings are not necessarily to scale. Generally, the same reference numbers in the drawing(s) and this description refer to the same or like parts. Although the drawings show regions with clean lines and boundaries, some or all of these lines and boundaries may be idealized. In reality, the boundaries and lines may be unobservable, blended or irregular.

DETAILED DESCRIPTION

One technique used to quantify the power consumption of transmitter devices is Peak-to-Average power Ratio (PAR). PAR is determined by (i) squaring the peak amplitude of the transmitter output signal to obtain the peak power consumed, (ii) calculating the root mean square (RMS) value of the transmitter output signal to obtain the average power consumed, and (iii) dividing the peak power consumed by the average power consumed. Generally, the performance of power amplifier circuitry within transmitter devices decreases as PAR increases. As a result, industry members seek to produce transmitters with low PAR.

Some transmitter devices maintain a low PAR by decreasing the amplitude (e.g., the magnitude) of peaks within the input signal before transmitting an output signal across a transmission medium. Decreasing the magnitude of peaks of the input signal lowers peak power consumption, which in turn lowers the PAR and improves the performance of the transmitter. As used herein, techniques to modify an input signal as described above may be referred to as Crest Factor Reduction (CFR).

Industry members employ a variety of CFR techniques to lower PAR. One such technique is Pulse Cancelling CFR (PC-CFR) techniques, which may also be referred to as Peak Cancelling CFR (PC-CFR). PC-CFR involves computing one or more Cancellation Pulses (CPs) based on attributes of one or more peaks of the input signal and adding the one or more CPs to the input signal in direction(s) opposite of the peak(s). Another such technique is windowed CFR, which involves multiplying the input signal with a window waveform similar to a CP.

Example PC-CFR techniques presented herein generate a CP based on stored data samples of a reference Pulse Cancellation Waveform (PCW), also referred to as a Peak Cancellation Waveform (PCW). In example PC-CFR techniques presented herein, the data samples of the PCW are scaled based on a cancellation phasor computed for a given peak of the input signal to generate the CP to cancel that given peak. Furthermore, example PC-CFR techniques presented herein access the data samples of PCW to be used to generate the CP to cancel the given peak based on a location of the given peak in the input signal.

Moreover, example PC-CFR techniques presented herein are able to generate multiple CPs for multiple signal peaks in parallel based on a single stored PCW. This is in contrast to other PC-CFR techniques that utilize multiple stored PCWs to generate multiple CPs, with each stored PCW dedicated to generating a different one of the CPs. As a result, example PC-CFR techniques presented herein can reduce memory resource footprint relative to such other techniques by a factor corresponding to the total number of CPs capable of being generated. As described in further detail below, such a memory footprint reduction is achieved by storing subsets of the data samples of the single PCW across multiple memories such that data samples corresponding to multiple CPs can be accessed in parallel, or multiple data samples corresponding to a single CP can accessed in parallel. Furthermore, example techniques to generate CPs described herein can also be applied to generate a window waveform used to multiply the input signal in windowed CFR applications.

Turning to the figures, FIG. 1 is a block diagram of an example communication system. FIG. 1 includes an example network 100, an example network device 102, an example client device 104, and an example transmission medium 106. The network device 102 includes example controller circuitry 108, example transmitter circuitry 110, and example receiver circuitry 112. Similarly, the client device 104 includes example controller circuitry 118, example receiver circuitry 114, and example transmitter circuitry 116. FIG. 1 is an example of transmitter devices implemented within a telecommunication use case. However, transmitter devices implemented in the teachings described herein may be implemented in any type of use case or application.

The network 100 connects and facilitates communication between various endpoint devices to support Internet or telephone devices. In the illustrated example, the network 100 is a cellular network. However, the example network 100 may be implemented using any suitable wired or wireless network(s) including, for example, one or more data buses, one or more local area networks (LANs), one or more wireless LANs (WLANs), one or more coaxial cable networks, one or more satellite networks, one or more private networks, one or more public networks, etc. As used above and herein, the term "communicate," including variants thereof (e.g., secure or non-secure communications, compressed or non-compressed communications, etc.), encompasses direct communication or indirect communication through one or more intermediary components and does not require direct physical (e.g., wired) communication or constant communication, but rather includes selective communication at periodic or aperiodic intervals, as well as one-time events.

The network device 102 may refer to any device that connects the client device 104 to other devices within the network 100. In FIG. 1, the network device 102 has a direct connection to the client device 104 via the transmission medium 106. In other examples, the network device 102 may indirectly communicate with the client device 104 by exchanging data across one or more intermediate devices. The network device 102 may operate using a wide variety of network communication protocols and perform a wide variety of cellular network operations. For example, the network device 102 may be implemented as one or more of a base station, a cell tower, a signal repeater, a macro remote radio unit (RRU), a Multiple-Input And Multiple-Output (MIMO) antenna system, a distributed antenna system (DAS), etc. Accordingly, the network device 102 does provide frequency profile information in some examples and does not provide frequency profile information in other examples.

The client device 104 refers to any endpoint device capable of connecting to the network 100. Accordingly, the client device 104 may form requests for data responsive to inputs from a user and transmit the requests over the network 100. Example devices that may implement the client device 104 may include but are not limited to a cell phone, a smart vehicle, a wearable device, etc.

In FIG. 1, the network device 102 and client device 104 communicate with one another using a cellular network protocol (e.g., 3G, 4G LTE, 5G, etc.). In some examples, the network device 102 and client device 104 may use a different wireless or wired communication protocol, including but not limited to Universal Serial Bus (USB), Ethernet, Wireless Fidelity (Wi-Fi)®, Bluetooth®, Near Field Communication (NFC), Orthogonal Frequency-Division Multiplexing (OFDM), Code-Division Multiple Access (CDMA), etc. In some examples, the type of communication protocol used between the network device 102 and client device 104 is based in part on whether the transmission medium 106 is a wired or wireless medium.

The controller circuitry 108 receives data from a source (e.g., an internal memory, the client device 104, etc.) and performs operations responsive to the data. For example, the controller circuitry 108 generates a digital input signal x(n) to be provided to the client device 104. Similarly, the controller circuitry 118 receives data from a source and performs operations responsive to the data. The controller circuitry 108 and 118 may be implemented by any type of programmable circuitry. Examples of programmable circuitry include programmable microprocessors, Field Programmable Gate Arrays (FPGAs) that may instantiate instructions, Central Processor Units (CPUs), Graphics Processor Units (GPUs), Digital Signal Processors (DSPs), or microcontrollers and integrated circuits (ICs) such as Application Specific Integrated Circuits (ASICs).

The transmitter circuitry 110 and the transmitter circuitry 116 receive digital signals from the controller circuitry 108 and the controller circuitry 118, respectively. The transmitter circuitry 110 and 116 both perform signal processing operations that include CFR as described in the teachings herein. Accordingly, the example transmitter circuitry 110 and transmitter circuitry 116 can be implemented within the network device 102 and client device 104, respectively, at less cost and size than other transmitter devices. The transmitter circuitry 110 is described further in connection with FIG. 2.

The receiver circuitry 112 receives the analog signal transmitted by the transmitter circuitry 116, converts the analog signal into a digital signal, and provides the digital signal to the controller circuitry 108. Similarly, the receiver circuitry 114 receives the analog signal transmitted by the transmitter circuitry 110, converts the analog signal into a digital signal, and provides the digital signal to the controller circuitry 118.

As mentioned above, the network device 102 and client device 104 communicate with one another using a network protocol. For example, the network device 102 may be a 4G/5G base station 102 that communicates with the client device 104, such as in the case of the client device 104 being a mobile device 104. If signals transmitted from a 4G/5G base station exhibit a high PAR, the transmitted circuitry may implement a power back-off in the power amplifier (PA), which reduces output RMS power and PA efficiency. As a result, in the illustrated example, the transmitter circuitry 110 of the network device 102 implements CFR to enable the PA(s) used in the network device 102 to operate at higher RMS power and to ease the operation of Digital Pre-Distortion (DPD). In some examples, the transmitter circuitry 116 of the client device 104 implements CFR for similar reasons In the illustrated example, transmitter circuitry 110 of the network device 102 employs CFR to reduce the PAR of the baseband signal prior to DPD. For example, the complex baseband time domain input signal is processed across multiple CFR stages to limit the peak magnitude to a target PAR, but without degrading the Adjacent Channel Leakage Ratio. As described in further detail below, a given CFR stage includes interpolation of the complex base-band signal to a higher sampling rate, identifying peaks, and computing one or more cancellation waveforms to reduce or cancel the peak(s). CFR enables better utilization of PA dynamic range, increasing efficiency, by enabling the PA to operate at a higher RMS power.

Figure 2:
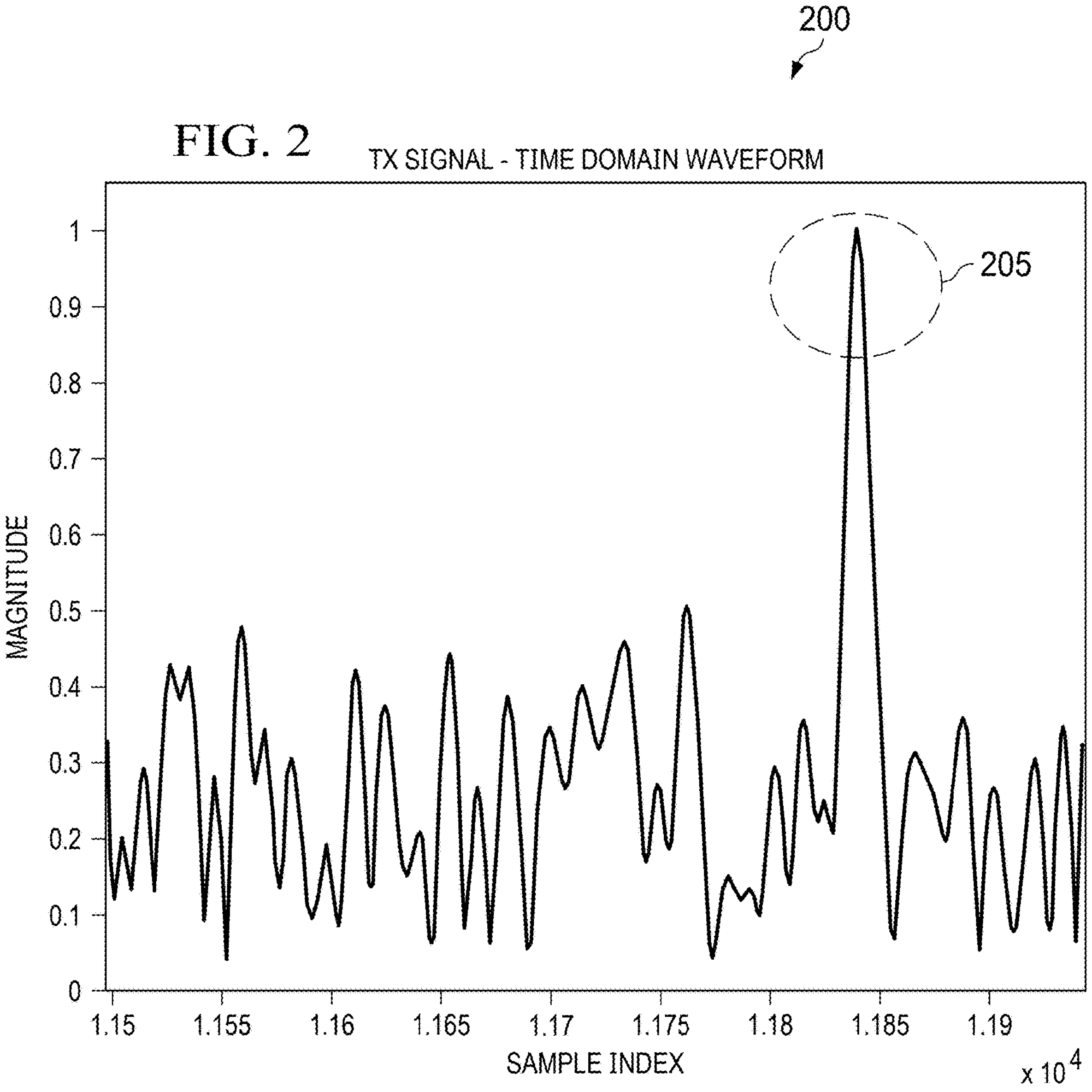
FIG. 2 illustrates an example envelope of a time-domain input signal to be transmitted by the transmitter circuitry included in the base station of FIG. 1.
Figure 3:
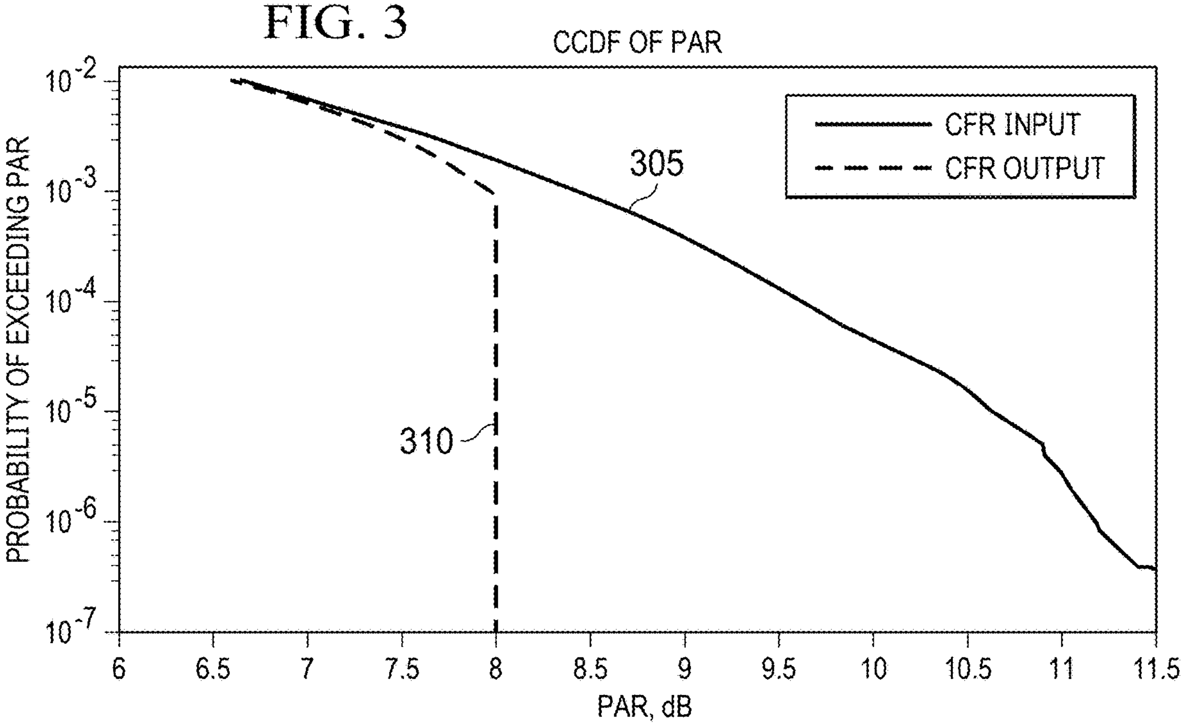
FIG. 3 is a graph of example complementary cumulative distribution functions that illustrate the effect of crest factor reduction on the time-domain input signal of FIG. 2.

An example complex baseband envelope 200 of an example time-domain input signal to be transmitted by the transmitter circuitry 110 of the network device 102 of FIG. 1 is illustrated in FIG. 2. This envelope 200 of the example signal exhibits occasional peaks, such as an example peak 205 with PAR of ~12 dB. A peak, such as the peak 205, could cause the PA of the network device 102 to operate in a saturation region, which would degrade the ACLR.

Figure 4:
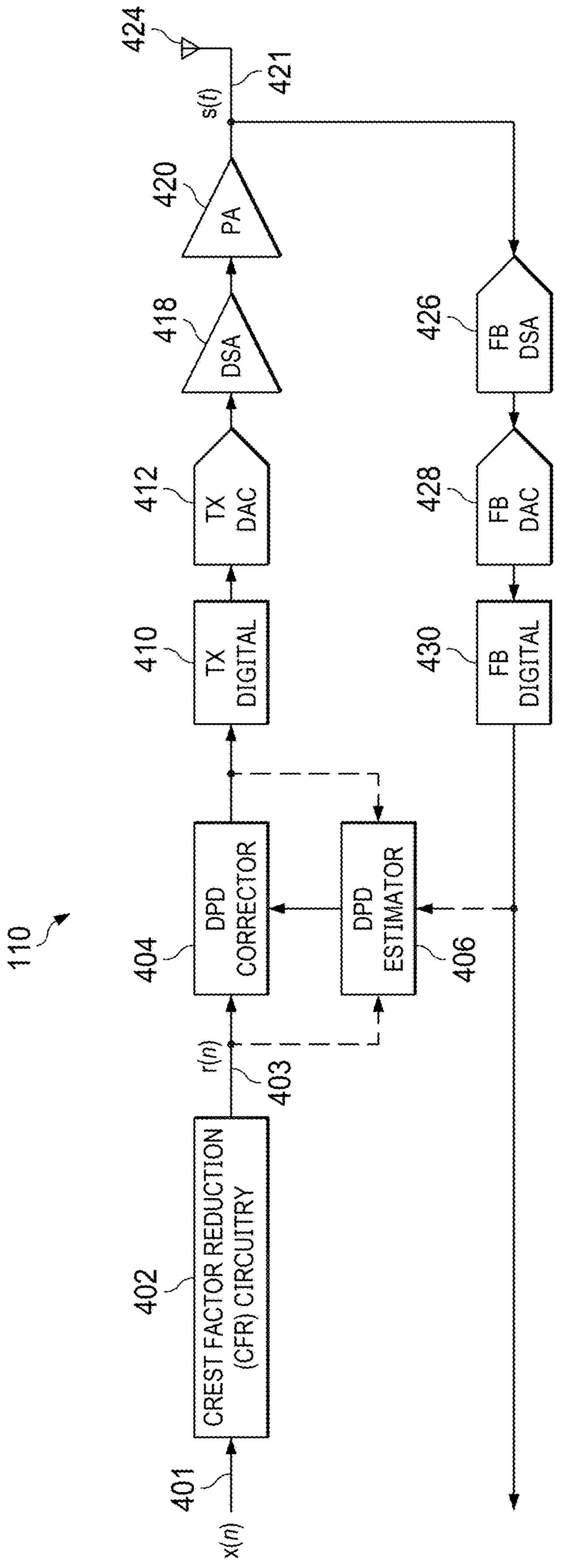
FIG. 4 is a block diagram of an example implementation of the transmitter circuitry included in the base station of FIG. 1.

CFR reduces the probability of the signal to be transmitted by the transmitter circuitry 110 of the network device 102 exceeding a PAR target. Example complementary cumulative distribution function (CCDFs) curves 305 and 310 illustrating the effect of CFR on signals transmitted by transmitter circuitry 110 of the network device 102 of FIG. 1 is illustrated in FIG. 4. In the illustrated example, the CFR algorithm implemented by the transmitter circuitry 110 of the network device 102 has an example PAR target of 8 dB. The curve 305 represents the CCDF of an example input signal corresponding to the input transmit signal of FIG. 2, which has a PAR of ~12 dB that exceeds the PAR target. The curve 310 represents the CCDF of a resulting example output signal from CFR processing implemented by the transmitter circuitry 110. The CCDF 310 shows that the output signal from CFR processing is restricted to the PAR target of 8 dB. As described in further detail below, the CFR operation is performed in the transmitter circuitry 110 prior to DPD correction to limit the PAR of the output transmit signal from the transmitter circuitry 110 of the network device 102.

FIG. 4 is a block diagram of an example implementation of the transmitter circuitry 110 of FIG. 1. The transmitter circuitry 110 includes example CFR circuitry 402, example digital pre-distortion (DPD) corrector circuitry 404, example DPD estimator circuitry 406, example transmitter (TX) digital circuitry 410, example TX Digital to Analog Converter (DAC) circuitry 412, example TX digital step attenuator (DSA) circuitry 418, example power amplifier (PA) circuitry 420, an example antenna 424, example feedback (FB) Analog to Digital Circuitry (ADC) 428, and example FB digital circuitry 430. FIG. 4 also includes example input signal 401 (referred to herein as x(n) 401), and an example modified signal 403 (which may be referred to herein as r(n) 403), an example output signal 421 (which may be referred to herein as s(t) 421).

The CFR circuitry 402 reduces or suppresses peaks within x(n) 401 to produce a modified signal, r(n) 403, that has a lower PAR than x(n) 401. By reducing or suppressing peaks, the local maxima that remain in r(n) 403 may also have smaller magnitudes than the local maxima of x(n) 401. The example CFR circuitry 402 produces r(n) 403 by performing PC-CFR operations as described in the teachings herein.

The DPD corrector circuitry 404 pre-distorts r(n) 403 to counteract distortion that occurs when the signal is amplified in power by the PA 420. The DPD corrector circuitry 404 performs the pre-distortion using various configuration parameters. The values of the configuration parameters are updated by the DPD estimator circuitry 406. The DPD estimator circuitry 406 samples r(n) 403, the output of the DPD corrector circuitry 404, and s(t) 421 (e.g., the output of the PA circuitry 420) to aid in the determination of how r(n) 403 will be pre-distorted. One or more of the DPD corrector circuitry 404 or the DPD estimator circuitry 406 may be implemented by any type of programmable circuitry.

The TX digital circuitry 410 interpolates the output of the DPD corrector circuitry 404 to introduce additional data points. The additional data points increase the sample rate of the modified signal relative to the sample rate of the original input signal x(n) 401. The example TX digital circuitry 410 both i) ensures that the frequency of information in the output signal s(t) 421 is sufficiently high so that the receiver circuitry 114 can recover the information, and ii) allows the DPD corrector circuitry 404 to only sample the signal for pre-distortion when necessary (e.g., at a relatively lower frequency).

The example TX DAC circuitry 412 converts the output of the TX digital circuitry 410 from a digital signal to an analog signal. As a result, information transmitted across the transmission medium 106 is encoded continuously across a range of voltages rather than a discrete set of voltages.

The example TX DSA circuitry 418 attenuates the foregoing analog signal so that the PA circuitry 420 consumes a consistent amount of power. The TX DSA circuitry 418 performs the attenuation responsive to the gain of the PA circuitry 420, which may change responsive to temperature. The PA circuitry 420 then amplifies the interpolated and attenuated signal to produce the transmit s(t) 421, which is transmitted across the transmission medium 106 via the antenna 424. The amplification of the PA circuitry 420 introduces non-linearity that is counteracted by the pre-distortion of the DPD corrector circuitry 404.

The FB DSA circuitry 426 receives the analog signal s(t) 421 from the PA circuitry 420 and attenuates the signal. In some examples, the FB DSA circuitry 426 attenuates the signal s(t) 421 responsive to the operating parameters of the FB ADC circuitry 428.

The FB ADC circuitry 428 converts the attenuated version of z(t) 421 from an analog signal back to a digital signal. The FB digital circuitry 430 then decimates (e.g., removes data points from) the digital signal. The resulting signal is obtained by the DPD estimator circuitry 406 and the controller circuitry 108.

Figure 5:
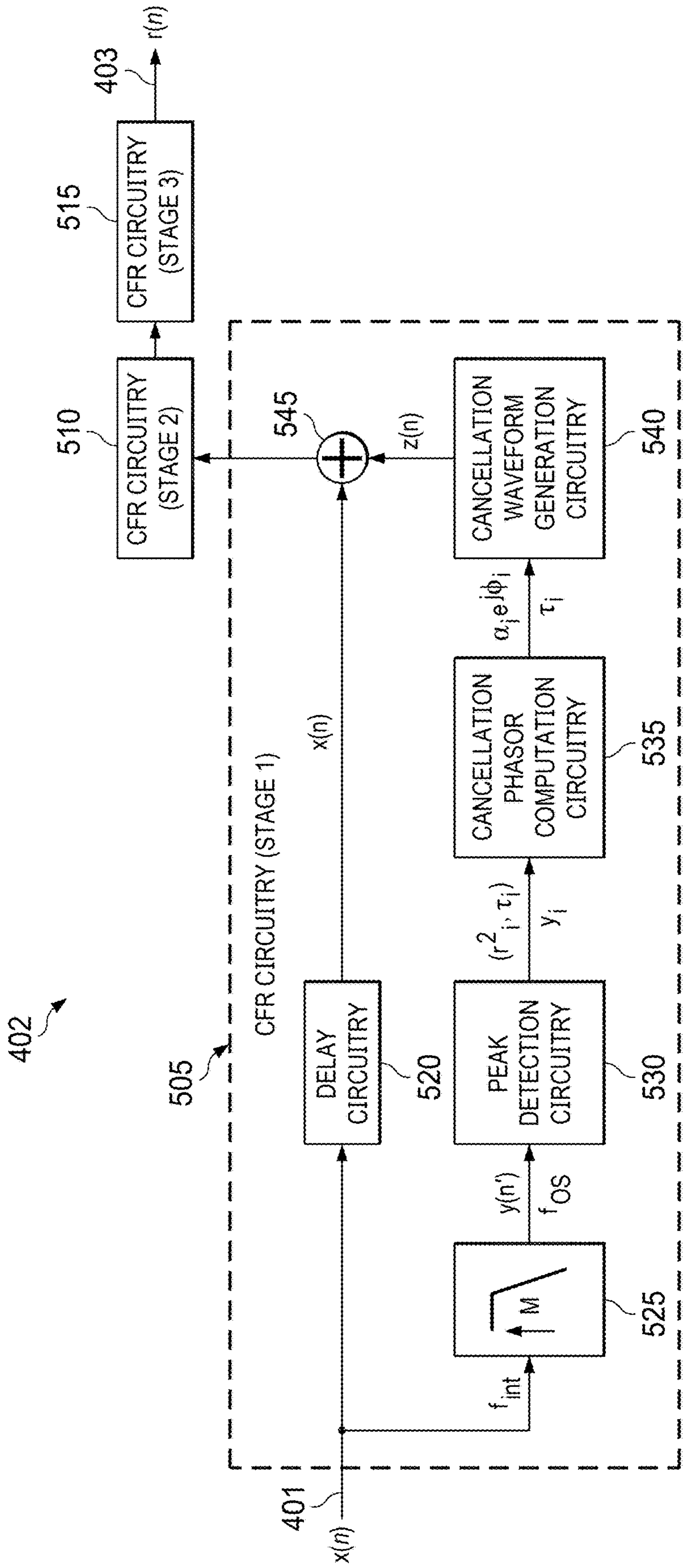
FIG. 5 is a block diagram of an example implementation of the crest factor reduction circuitry included in the transmitter circuitry of FIG. 4.

FIG. 5 is a block diagram of example implementation of the CFR circuitry 402 included in the example transmitter circuitry 110 of FIG. 4. The CFR circuitry 402 of FIG. 5 may be instantiated (e.g., creating an instance of, bring into being for any length of time, materialize, implement, etc.) by programmable circuitry such as a Central Processor Unit (CPU) executing first instructions. Also, the CFR circuitry 402 of FIG. 5 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 5 may, thus, be instantiated at the same or different times. Some or all of the circuitry of FIG. 5 may be instantiated, for example, in one or more threads executing concurrently on hardware or in series on hardware. Moreover, in some examples, some or all of the circuitry of FIG. 5 may be implemented by microprocessor circuitry executing instructions or FPGA circuitry performing operations to implement one or more virtual machines or containers.

The example CFR circuitry 402 of FIG. 5 includes example CFR circuitry stages 505, 510 and 515. The CFR circuitry stage 505 of the illustrated example includes example delay circuitry 520, example interpolation circuitry 525, example peak detection circuitry 530, example cancellation phasor computation circuitry 535, example cancellation waveform generation circuitry 540, and example compensation circuitry 545. In the illustrated example, the CFR circuitry stages 510 and 515 also include respective instances of the example delay circuitry 520, the example interpolation circuitry 525, the example peak detection circuitry 530, the example cancellation phasor computation circuitry 535, the example cancellation waveform generation circuitry 540, and the example compensation circuitry 545. Although three (s) CFR circuitry stages 505, 510 and 515 are illustrated in the example of FIG. 5, the CFR circuitry 402 can include fewer CFR circuitry stages (e.g., just the CFR circuitry stage 505 or just the CFR circuitry stages 505 and 510) or more CFR circuitry stages.

At a high-level, the CFR circuitry 402 of the illustrated example implements PC-CFR. PC-CFR involves peak detection and peak cancellation. For example, input signal envelope crossings above the peak limit commensurate with a PAR target value are monitored to detect occurrences of peaks, also referred to as crests, in the input signal envelope. A pre-stored Peak Cancellation Waveform (PCW) is scaled based on peak attributes (e.g., position, amplitude, phase, etc.), and combined (e.g., added, subtracted, etc.) with the input signal to cancel or otherwise reduce the detected peaks. The CFR circuitry 402 of the illustrated example includes the multiple CFR stages 505, 510 and 515 to progressively remove further peaks that are detected after an earlier stage of peak detection and peak cancellation. Also, the CFR circuitry 402 of the illustrated example performs peak detection and peak cancellation with an oversampled PCW to support accurate alignment of the CP(s) with the detected peaks. For example, waveform oversampling factors of M=1, 2, 4, 8, etc., may be supported.

More specifically, in the example CFR circuitry 402 of FIG. 5, the complex baseband input signal x(n), which has data sampling rate corresponding to an interface sample rate of $f_{int}$, is provided to an input of the interpolation circuitry 525. The interpolation circuitry 525 interpolates or, in other words, oversamples the input signal x(n) by an oversample factor of M (e.g., 1, 2, 4 or 8) to generate complex baseband interpolated samples y(n'), with an oversampling rate of $f_{OS}$, at an output of the interpolation circuitry 525. As used herein, the index n refers to signal samples having the interface sample rate of $f_{int}$, and the index n' refers to signal samples having the oversampling rate of $f_{OS}$.

In the illustrated example, the output of the interpolation circuitry 525 is coupled to an input of the peak detection circuitry 530. The interpolated samples y(n') are provided to the input of the peak detection circuitry 530, which computes the envelope (e.g., magnitude) $|y(n')|^2$ of the complex baseband interpolated samples y(n'). The peak detection circuitry 530 compares the envelope (e.g., magnitude) $|y(n')|^2$ to a peak threshold $\lambda^2$ that corresponds to the PAR target of the CFR circuitry 402. The peak detection circuitry 530 detects one or more peaks $$r_i^2$$

that meet or exceed the peak threshold $\lambda^2$ and identifies the corresponding one or more sample locations (e.g., indices) $\tau_i$ of the one or more peaks $$r_i^2$$

in the complex baseband interpolated samples y(n'). In the illustrated example, the peak detection circuitry 530 is able to detect up to P peaks, such as P=6 or some other value. The peak detection circuitry 530 has an output to provide the peak values $$r_i^2,$$

the peak locations $\tau_i$, and the values of the interpolated samples $y_i$ at the peaks.

The output of the peak detection circuitry 530 is coupled to an input of the cancellation phasor computation circuitry 535. The peak values $$r_i^2,$$

the peak locations $\tau_i$, and the values of the interpolated samples y at the peaks are provided to the input of the cancellation phasor computation circuitry 535. For a given peak i, the cancellation phasor computation circuitry 535 computes a cancellation phasor $\alpha_i \exp^{j\varphi_i}$ based on the peak value $$r_i^2$$

and the sample value $y_i$ corresponding to that peak. The cancellation phasor $\alpha_i \exp^{j\varphi_i}$ for a given peak i has an amplitude $\alpha_i$ and a phase $\varphi_i$. The cancellation phasor computation circuitry 535 has an output to provide the cancellation phasor(s) $a_i \exp^{j\varphi t}$ and the peak location(s) $\tau_i$ for the detected peak(s) i.

The output of the cancellation phasor computation circuitry 535 is coupled to an input of the cancellation waveform generation circuitry 540. The cancellation phasor(s) $\alpha_i \exp^{j\varphi_i}$ and the peak location(s) $\tau_i$ for the detected peak(s) i are provided to the input of the cancellation waveform generation circuitry 540. For a given detected peak i, the cancellation waveform generation circuitry 540 accesses samples of a stored pulse cancellation waveform based on the peak's location $\tau_i$ to generate a cancellation pulse corresponding to that peak i. The cancellation waveform generation circuitry 540 also scales the cancellation pulse for the peak i by the cancellation phasor $\alpha_i \exp^{j\varphi_i}$ for the peak i to generate a scaled cancellation pulse corresponding to that peak i. The cancellation waveform generation circuitry 540 further combines (e.g., sums, adds, etc.) the respective scaled cancellation pulses determined for the detected peak(s) (e.g., up to P peaks in total) to generate an overall pulse cancellation signal z(n), which is able to cancel or otherwise reduce the detected peak(s) (e.g., up to P peaks in total) in the input signal. The cancellation waveform generation circuitry 540 has an output to provide the pulse cancellation signal z(n).

The output of the cancellation waveform generation circuitry 540 is coupled to an input of the compensation circuitry 545. The compensation circuitry 545 also has another input that is coupled to an output of the delay circuitry 520. The delay circuitry 520 has an input to accept the complex baseband input signal x(n). The delay circuitry 520 is configured to delay the complex baseband input signal x(n) by an amount to time to compensate for the length of the stored pulse cancellation waveform from its start position to the location of its peak, as well as the processing performed by the interpolation circuitry 525, the peak detection circuitry 530, the cancellation phasor computation circuitry 535 and the cancellation waveform generation circuitry 540.

The output of the delay circuitry 520 provides the delayed complex baseband input signal x(n) to one input of the compensation circuitry 545. The output of the cancellation waveform generation circuitry 540 provides the pulse cancellation signal z(n) to the other input of the compensation circuitry 545. The compensation circuitry 545 combines (e.g., adds, subtracts, etc.) the delayed complex baseband input signal x(n) with the pulse cancellation signal z(n) to produce an initial version of the modified signal r(n). In the illustrated example, the subsequent CFR circuitry stages 510 and 515 reproduce the foregoing processing successively on the initial version of the modified signal r(n) to output the modified signal r(n) 403 described above.

Figure 6:
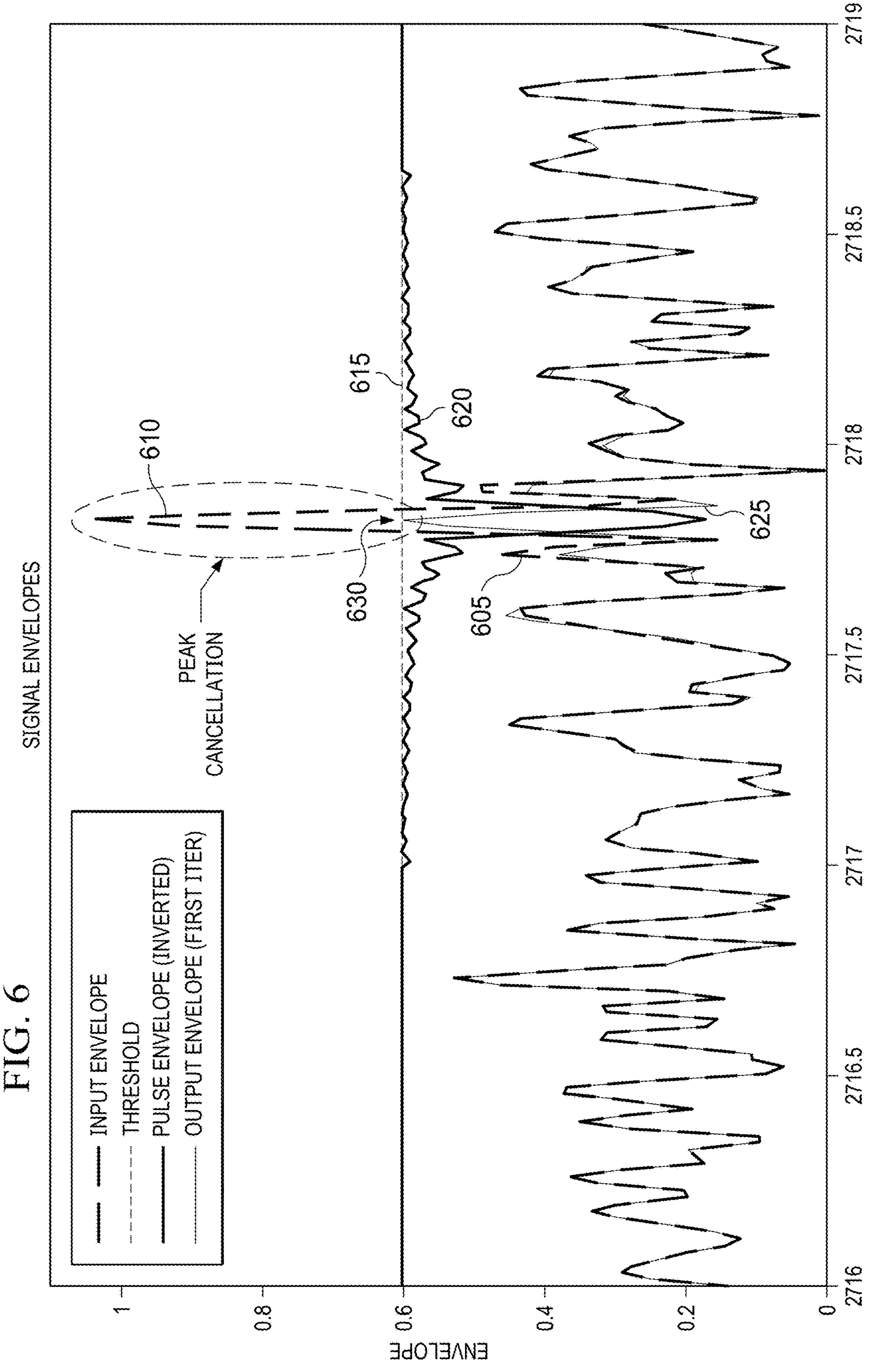
FIG. 6 illustrates an example operation of the crest factor reduction circuitry of FIGS. 4 and 5.

FIG. 6 illustrates an example operation of the CFR circuitry 402 of FIG. 4 or 5 to cancel a peak in an example input signal x(n). FIG. 6 depicts an example input signal envelope 605 corresponding to the input signal x(n). The input signal envelope 605 has an example peak 610 that is detected by the peak detection circuitry 530 as exceeding an example peak threshold 615, as described above. The cancellation phasor computation circuitry 535 and the cancellation waveform generation circuitry 540 generate an example scaled cancellation pulse z(n) having an example cancellation pulse envelope 620 capable of cancelling, or reducing, the peak 610, as described above. The compensation circuitry 545 combines the scaled cancellation pulse z(n) with the input signal x(n) to generate an example modified signal r(n) having an example modified signal envelope 625 in which the peak 610 has been reduced to an example peak 630 that satisfies (e.g., is less than or equal to) the peak threshold 615.

Figure 7:
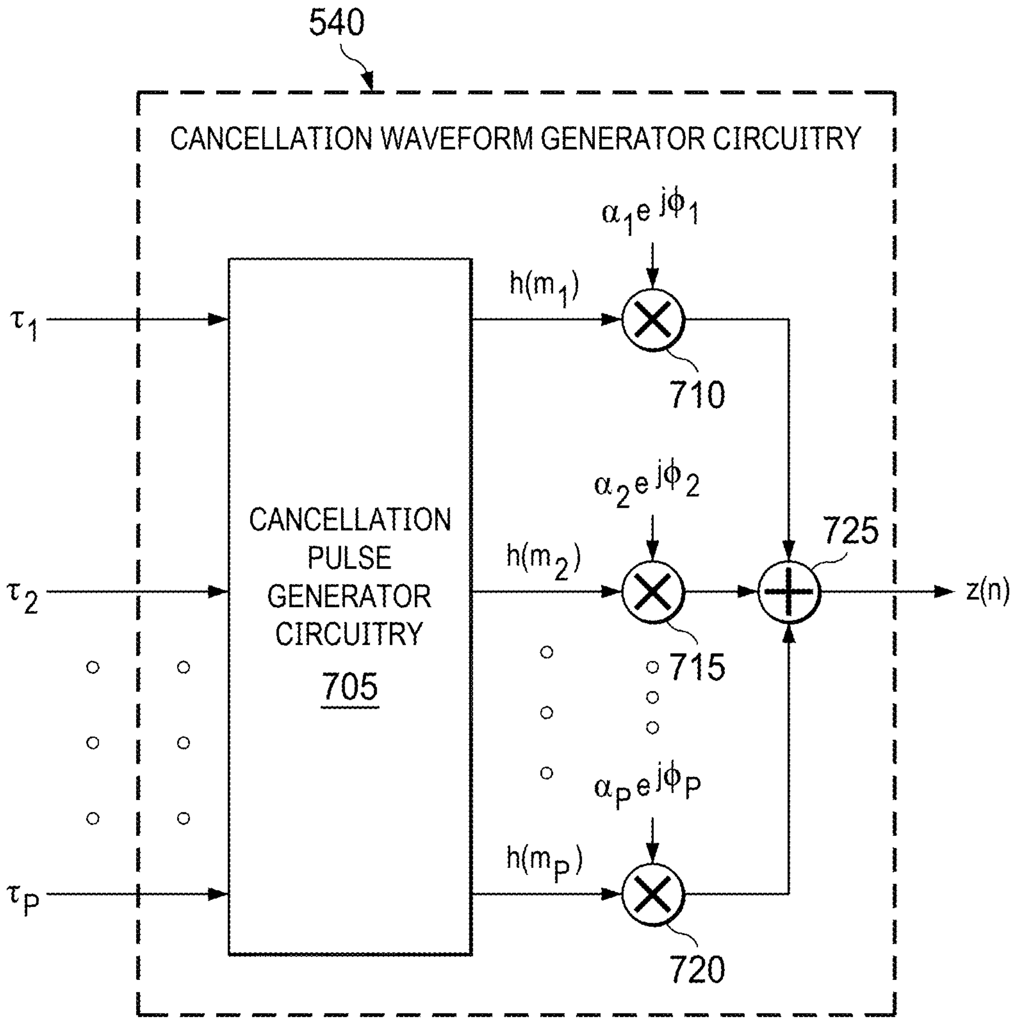
FIG. 7 is a block diagram of an example implementation of the cancellation waveform generation circuitry included in the example crest factor reduction circuitry of FIG. 5

FIG. 7 is a block diagram of an example implementation of the cancellation waveform generation circuitry 540 included in the example CFR circuitry 402 of FIG. 5. The cancellation waveform generation circuitry 540 of FIG. 7 may be instantiated (e.g., creating an instance of, bring into being for any length of time, materialize, implement, etc.) by programmable circuitry such as a Central Processor Unit (CPU) executing first instructions. Also, the cancellation waveform generation circuitry 540 of FIG. 7 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 7 may, thus, be instantiated at the same or different times. Some or all of the circuitry of FIG. 7 may be instantiated, for example, in one or more threads executing concurrently on hardware or in series on hardware. Moreover, in some examples, some or all of the circuitry of FIG. 7 may be implemented by microprocessor circuitry executing instructions or FPGA circuitry performing operations to implement one or more virtual machines or containers.

The cancellation waveform generation circuitry 540 of FIG. 7 includes example cancellation pulse generation circuitry 705, example scaling circuitry 710-720 and example summation circuitry 725. The cancellation pulse generation circuitry 705 of the illustrated example has one or more inputs to couple to the output of the phasor computation circuitry 535 to accept the oversampled time indices $\{\tau_1, \tau_2, \ldots, \tau_P\}$ corresponding to the locations of the one or more peaks detected by the peak detection circuitry 530 in the oversampled (e.g., interpolated) input signal samples y(n'). The cancellation pulse generation circuitry 705 is capable of generating up to P cancellation pulses corresponding to up to P peak detected in a current peak cancellation window of the input signal. For example, the limit on the number of peaks P capable of being cancelled may be P=6 or some other value.

In the illustrated example, the current peak cancellation window utilized by the cancellation pulse generation circuitry 705 corresponds to the current sample index n of the input signal x(n). For example, the current peak cancellation window may be centered at the current sample index n of the input signal x(n). In the illustrated example, the peak cancellation window extends on either side of the current sample index n and has a span corresponding to the number of equivalent interface rate samples of the stored PCW used by the cancellation pulse generation circuitry 705 to generate its output cancellation pulse(s). For example, if the number of oversampled samples of the PCW stored in memory is N and the oversampling factor of the interpolation circuitry 525 is M, then the number of equivalent interface rate samples of the stored PCW is N/M.

In the illustrated example, the cancellation pulse generation circuitry 705 has a set of outputs to provide the cancellation pulse(s) corresponding to the peak(s) detected in the oversampled (e.g., interpolated) input signal samples y(n'). For example, the cancellation pulse generation circuitry 705 reads out one or more (≤P) samples $\{h(m_1), h(m_2), \ldots, h(m_P)\}$ from the PCW storage memory, where h(·) represents the stored PCW, and the indices $m_1, m_2, \ldots, m_P$ represent the respective index sequence(s) corresponding to the respective one or more (≤P) cancellation pulses generated by the cancellation pulse generation circuitry 705. The cancellation pulse generation circuitry 705 determines the indice(s) $m_1, m_2, \ldots, m_P$ of the cancellation pulse(s) $h(m_1), h(m_2), \ldots, h(m_P)$ based on the peak location time indice(s) $\{\tau_1, \tau_2, \ldots, \tau_P\}$ and the current sample index n. In the illustrated example, the cancellation pulse generation circuitry 705 can read out multiple PCW samples with arbitrary indices $\{m_1(n), m_2(n), \ldots, m_P(n)\}$ in parallel (e.g., in the input sample instance n, in the same read clock interval, etc.) from the PCW storage memory. Also, the cancellation pulse generation circuitry 705 can change the memory indices when a prior detected peak leaves the peak cancellation window, when a new peak is detected in the peak cancellation window, etc.

The scaling circuitry 710-720 has a set of inputs to couple to the set of outputs of the cancellation pulse generation circuitry 705 to accept the one or more (≤P) samples $\{h(m_1), h(m_2), \ldots, h(m_P)\}$ corresponding to the one or more cancellation pulses generated by the cancellation pulse generation circuitry 705. The scaling circuitry 710-720 also has another set of inputs to couple to the output(s) of the cancellation phasor computation circuitry 535 to accept the one or more cancellation phasors $\alpha_i \exp^{j\varphi_i}$ computed by the cancellation phasor computation circuitry 535 for the one or more cancellation pulses. The cancellation phasor computation circuitry 535 scales (e.g., multiplies) the one or more (≤P) samples $\{h(m_1), h(m_2), \ldots, h(m_P)\}$ corresponding to the one or more cancellation pulses by the respective one or more cancellation phasors $\alpha_1 \exp^{j\varphi_1}, \alpha_2 \exp^{j\varphi_2}, \ldots, \alpha_P \exp^{j\varphi_P}$ to determine the one or more scaled cancellation pulses to be used to cancel, or reduce, the corresponding one or more peaks located at the peak location time indice(s) $\{\tau_1, \tau_2, \ldots, \tau_P\}$. The scaling circuitry 710-720 has a set of outputs to provide the one or more (≤P) samples $\{h(m_1), h(m_2), \ldots, h(m_P)\}$ corresponding to the one or more cancellation pulses.

The summation circuitry 725 has a set of inputs to couple to the set of outputs of scaling circuitry 710-720 to accept the one or more (≤P) samples $\{h(m_1), h(m_2), \ldots, h(m_P)\}$ corresponding to the one or more cancellation pulses to be used to cancel, or reduce, the corresponding one or more peaks located at the peak location time indice(s) $\{\tau_1, \tau_2, \ldots, \tau_P\}$. The summation circuitry 725 sums or otherwise combines the one or more (≤P) samples $\{h(m_1), h(m_2), \ldots, h(m_P)\}$ corresponding to the one or more cancellation pulses to generate the overall pulse cancellation signal sample z(n). The summation circuitry 725 has an output to provide the overall pulse cancellation signal sample z(n), which is added to or otherwise combined with the delayed base-band input sample x(n) by the compensation circuitry 545, as described above.

Figure 8:
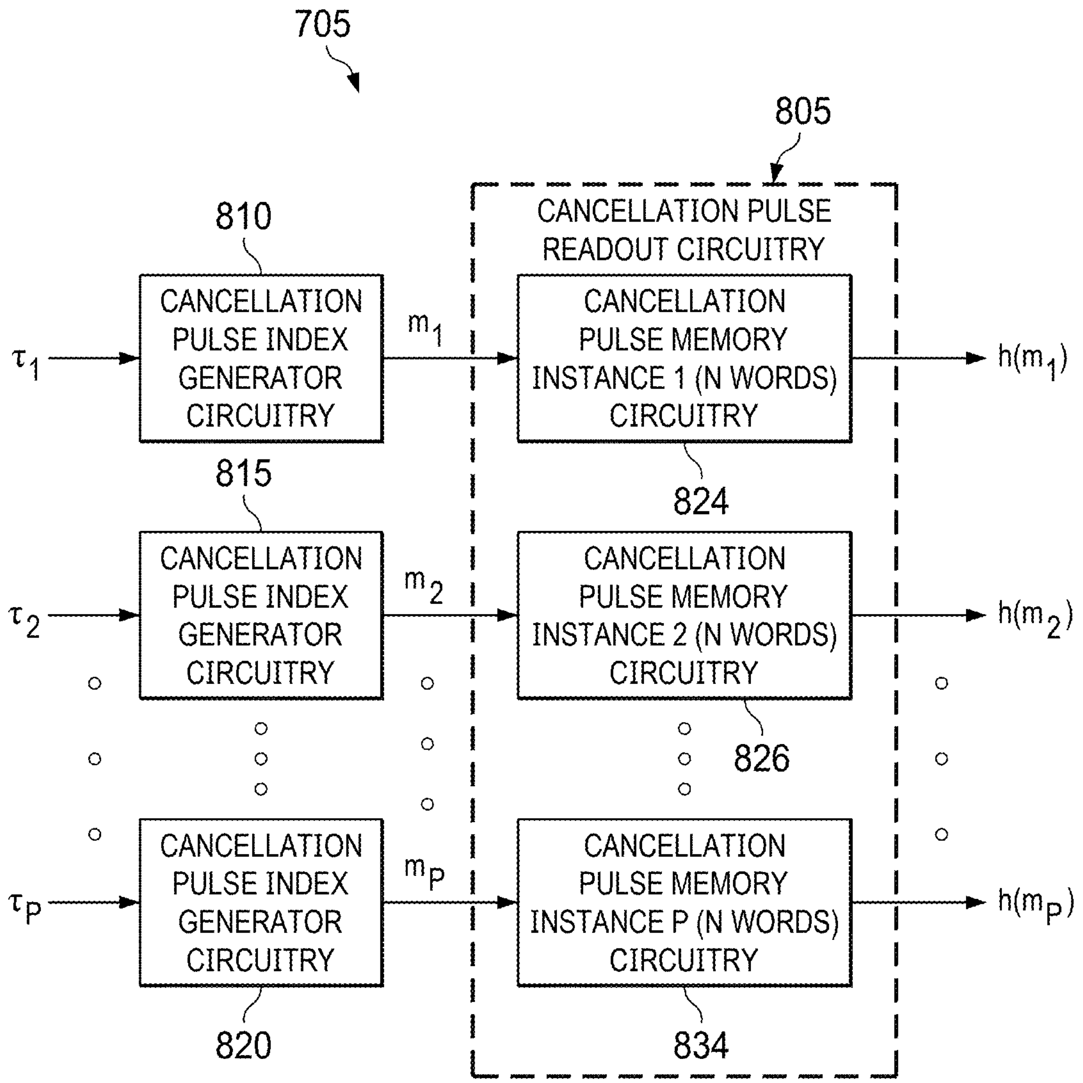
FIG. 8 is a block diagram of a first example implementation of the cancellation pulse generation circuitry included in the cancellation waveform generation circuitry of FIG. 7.

FIG. 8 is a block diagram of a first example implementation of the cancellation pulse generation circuitry 705 included in the example cancellation waveform generation circuitry 540 of FIG. 7. The cancellation pulse generation circuitry 705 of FIG. 8 may be instantiated (e.g., creating an instance of, bring into being for any length of time, materialize, implement, etc.) by programmable circuitry such as a Central Processor Unit (CPU) executing first instructions. Also, the cancellation pulse generation circuitry 705 of FIG. 8 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 8 may, thus, be instantiated at the same or different times. Some or all of the circuitry of FIG. 8 may be instantiated, for example, in one or more threads executing concurrently on hardware or in series on hardware. Moreover, in some examples, some or all of the circuitry of FIG. 8 may be implemented by microprocessor circuitry executing instructions or FPGA circuitry performing operations to implement one or more virtual machines or containers.

The cancellation pulse generation circuitry 705 of FIG. 8 includes example cancellation pulse readout circuitry 805 and one or more instances of example cancellation pulse (CP) index generation circuitry 810-820. The cancellation pulse readout circuitry 805 includes one or more example CP memories 824-834. In the example of FIG. 8, the number of instances of the CP index generation circuitry 810-820 and the number of CP memories 824-834 corresponds to the maximum number of cancellation pulses P that can be generated by the cancellation pulse generation circuitry 705 at a given time, which corresponds to the maximum number of peaks P that can be cancelled simultaneously.

To support generating the samples for up to P cancellation pulses $h(m_1), h(m_2), \ldots, h(m_P)$ in parallel, the cancellation pulse readout circuitry 805 includes P CP memories 824-834 (e.g., such as P=6 or some other value), each dedicated to generating a different one of the up to P possible cancellation pulses. Furthermore, each of the CP memories 824-834 stores a separate, complete copy of the reference PCW, which has N samples, as described above. Thus, each of the CP memories 824-834 is sized to store at least N data samples, which corresponds to the complete, oversampled size of the reference PCW. For example, assume 24 bits are used to represent the in-phase (I) and quadrature (Q) components of each complex data sample of the reference PCW, and reference PCW includes N=4096 samples. Then, each of the CP memories 824-834 needs a storage capacity of at least 12 kilobytes (KB) (corresponding to ((4096*24)/8)/1024). Furthermore, if generation of up to P=6 cancellation pulses is to be supported, and there are three (3) CFR circuitry stages and four (4) transmit paths to be supported, the total PCW memory storage capacity required for the cancellation pulse readout circuitry 805 is 864 kB (corresponding to 12*6*3*4).

In the illustrated example of FIG. 8, each of the CP memories 824-834 is paired with a respective instance of the index generation circuitry 810-820 to allow the CP memories 824-834 to be accessed in parallel. Furthermore, the pair of the $i^{th}$ instance of the index generation circuitry 810-820 and its corresponding $i^{th}$ memory 824-834 is responsible for generating the $i^{th}$ cancellation pulse $h(m_i)$ for the $i^{th}$ peak to be cancelled. More specifically, for a current input sample index n of the input signal x(n) 401, the $i^{th}$ CP index generation circuitry 810-820 computes a corresponding memory index $m_i(n)$ that corresponds to the sample of the PCW that is to be read out from its corresponding CP memory 824-834 to generate the $i^{th}$ cancellation pulse $h(m_i)$ for the $i^{th}$ peak to be cancelled. In the illustrated example, the $i^{th}$ CP index generation circuitry 810-820 generates the memory index $m_i(n)$ to access the cancellation pulse sample $h(m_i)$ from its corresponding CP memory 824-834 using Equation 1, which is:

$$m_i(n) = M * n - \tau_i \qquad \text{Equation 1}$$

In Equation 1, M is the oversampling factor, $\tau_1$ is the time index of the detected peak (at the oversampled rate), Δ is the group delay (at the oversampled rate) of the PCW, n is the current input sample time index, and i ranges from 1 up to P possible pulses that can be cancelled. (In some examples, Equation 1 can be modified to account for implementation-related latencies.) Thus, the instances of the index generation circuitry 810-820 have respective inputs to accept the respective oversampled location time indices $\{\tau_1, \tau_2, \ldots, \tau_P\}$ corresponding to the locations of the one or more peaks (up to P) for which cancellation pulses are to be generated. The respective instances of the index generation circuitry 810-820 utilize Equation 1 to generate the respective sample indice(s) $m_1, m_2, \ldots, m_P$ of the stored PCWs h(•) that are to read out to generate the respective cancellation pulse(s) $h(m_1), h(m_2), \ldots, h(m_P)$ based on the peak location time indice(s) $\{\tau_1, \tau_2, \ldots, \tau_P\}$. The respective instances of the index generation circuitry 810-820 have outputs to use their generated sample indice(s) $m_1, m_2, \ldots, m_P$ to access their respective paired CP memories 824-834 to cause the memories to output the respective cancellation pulse(s) $h(m_1)$, $h(m_2), \ldots, h(m_P)$, as shown. As such, each pair of the $i^{th}$ CP index generation circuitry 810-820 and the corresponding $i^{th}$ CP memory 824-834 operate to generate an $i^{th}$ cancellation pulse to cancel, or reduce, the it peak at location time index $\tau_1$.

Figure 9:
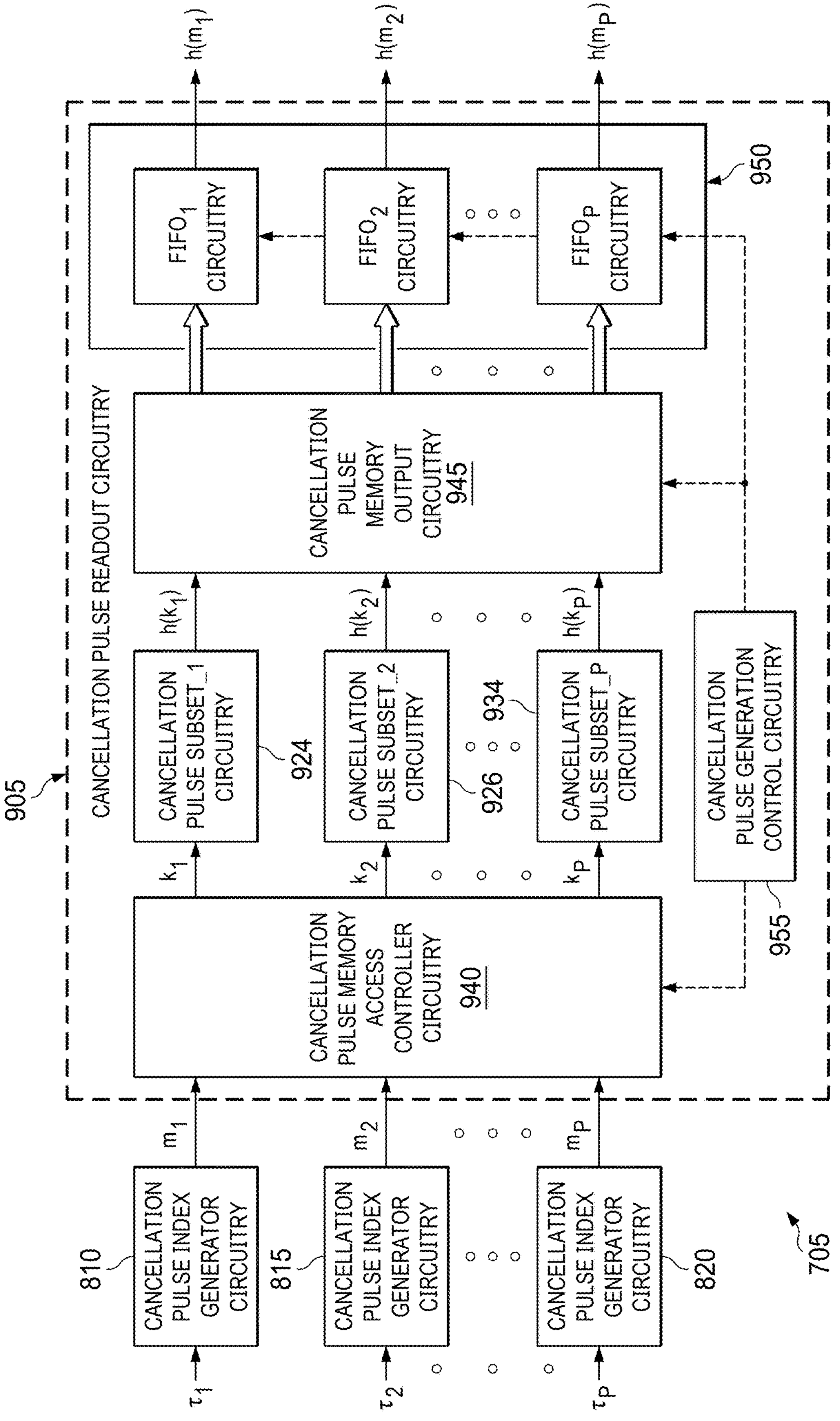
FIG. 9 is a block diagram of a second example implementation of the cancellation pulse generation circuitry included in the cancellation waveform generation circuitry of FIG. 7.

FIG. 9 is a block diagram of a second example implementation of the cancellation pulse generation circuitry 705 included in the example cancellation waveform generation circuitry 540 of FIG. 7. The cancellation pulse generation circuitry 705 of FIG. 9 may be instantiated (e.g., creating an instance of, bring into being for any length of time, materialize, implement, etc.) by programmable circuitry such as a Central Processor Unit (CPU) executing first instructions. Also, the cancellation pulse generation circuitry 705 of FIG. 9 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 9 may, thus, be instantiated at the same or different times. Some or all of the circuitry of FIG. 9 may be instantiated, for example, in one or more threads executing concurrently on hardware or in series on hardware. Moreover, in some examples, some or all of the circuitry of FIG. 9 may be implemented by microprocessor circuitry executing instructions or FPGA circuitry performing operations to implement one or more virtual machines or containers.

The cancellation pulse generation circuitry 705 of FIG. 9 includes the CP index generation circuitry 810-820 described above in connection with FIG. 8. Thus, as described above in connection with FIG. 8, the CP index generation circuitry 810-820 generates up to P respective sample indices $m_1, m_2, \ldots, m_P$ that identify the up to P PCW samples that are to be read out of memory to generate the up to P corresponding cancellation pulses $h(m_1), h(m_2), \ldots, h(m_P)$. As further described above, the CP index generation circuitry 810-820 generates up to P respective sample indices $m_1, m_2, \ldots, m_P$ based on Equation 1.

However, in contrast with the cancellation pulse readout circuitry 805 included in the cancellation pulse generation circuitry 705 of FIG. 8, the cancellation pulse generation circuitry 705 of FIG. 9 includes example cancellation pulse readout circuitry 905 that implements a crest factor reduction architecture that employs a fraction of the memory with an association potential for reduced area and power consumption. To implement this architecture, the example cancellation pulse readout circuitry 905 of FIG. 9 includes example CP memories 924-934, also referred to as example CP subset memories 924-934, that have a reduced memory footprint relative to the CP memories 824-834 in the cancellation pulse readout circuitry 805 of FIG. 8. In some examples, one or more of the CP subset memories 924-934 are included in the transmitter circuitry 110, but are implemented externally relative to the CFR circuitry 402 and the cancellation pulse readout circuitry 905. The cancellation pulse readout circuitry 905 of FIG. 9 further includes example CP memory access controller circuitry 940, example CP memory output circuitry 945, example buffer circuitry 950 and example CP generation control circuitry 955.

At a high level, to achieve a reduced memory footprint, the cancellation pulse readout circuitry 905 operates as follows. In the cancellation pulse readout circuitry 905, the CP subset memories 924-934 collectively store a single instance of the reference PCW, with the N data samples of the single reference PCW partitioned across P CP subset memories 924-934 such that each subset memory stores N/P samples of the reference PCW. To allow the P CP subset memories 924-934 to be accessed in parallel (e.g., in the input sample instance n, in the same read clock interval, etc.), the CP memory access controller circuitry 940 transforms the up to P distinct PCW sample indices $\{m_1, m_2, \ldots, m_P\}$ corresponding to the up to P cancellation pulses to be generated into a transformed set of up to P subset memory indices $\{k_1, k_2, \ldots, k_P\}$, with each transformed index $k_1, k_2, \ldots, k_P$ to access a different one of the P subset memories. The CP memory output circuitry 945 reorders the up to P outputs $\{h(k_1), h(k_2), \ldots, h(k_P)\}$ of the CP subset memories 924-934, which correspond to the transformed memory indices $\{k_1, k_2, \ldots, k_P\}$, and provides the reordered CP subset memory outputs to the buffer circuitry 950. The buffer circuitry 950 includes P different first-input-first-output (FIFO) buffers, with each buffer corresponding to a different generated cancellation pulse such that the FIFO buffers output (after appropriate delays, as described below) the respective cancellation pulse samples $\{h(m_1), h(m_2), \ldots, h(m_P)\}$ for the up to P cancellation pulses to be generated. The CP generation control circuitry 955 controls the index transformation performed by the CP memory access controller circuitry 940, the output sample reordering performed by the CP memory output circuitry 945, and the delay(s) configured for the FIFOs in the buffer circuitry 950, as a function of the current input sample index n.

As noted above, multiple peaks can be detected within the peak cancellation window. To generate the cancellation pulses for each of the peaks, the cancellation pulse readout circuitry 905 is able to read out P different arbitrary sample indices of the reference PCW in parallel. The reference PCW includes samples at the oversampled rate, but the cancellation pulses are generated at the interface rate, and with potentially different sampling phase offsets. Furthermore, the cancellation pulse readout circuitry 905 operates with deterministic latency such that when a new peak is detected within the peak cancellation window, a corresponding cancellation pulse is generated with an appropriate fixed latency.

In the cancellation pulse readout circuitry 805 of FIG. 8, P instances of dedicated CP memories 824-834, each with a size to store N data sample, were used to store identical copies of the reference PCW. That arrangement allowed the cancellation pulse readout circuitry 805 to index each memory independently. In contrast, the cancellation pulse readout circuitry 905 of FIG. 9 partitions the N samples of a single reference PCW into P instances of the CP subset memories 924-934, each sized to store just N/P data samples, resulting in a factor of P reduction in memory area/footprint. However, without proper partitioning, it may not be possible to access P different arbitrary sample indices of the reference PCW in parallel from the CP subset memories 924-934, as some of the requisite samples could have been stored in the same subset memory 924-934.

Figure 10A:
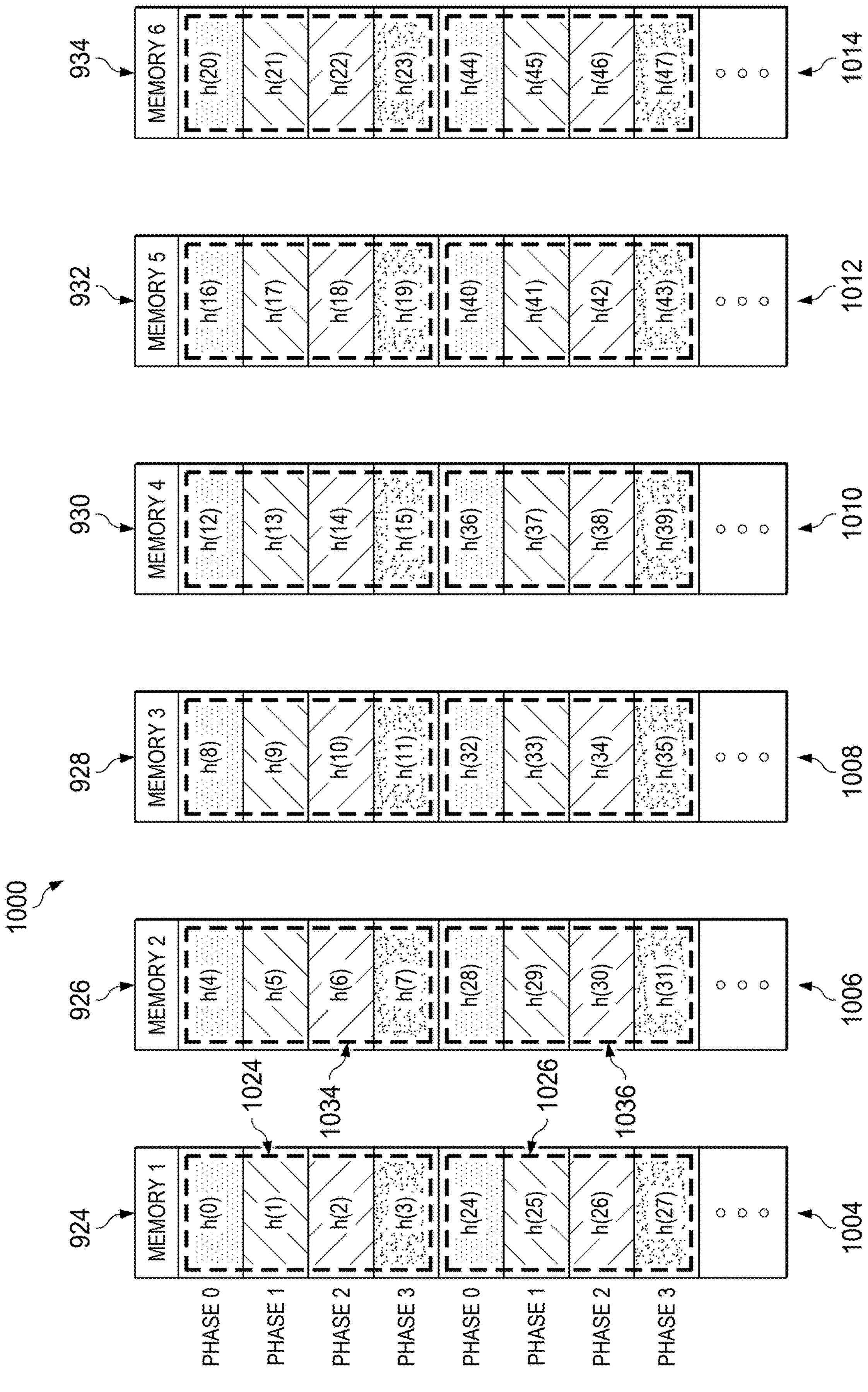
FIG. 10A illustrates an example partitioning of a reference pulse cancellation waveform across the cancellation pulse subset memories included in the cancellation pulse generation circuitry of FIG. 9.

FIG. 10A illustrates an example partitioning 1000 of the samples of a single reference PCW across the CP subset memories 924-934. The example partitioning 1000 is based on the fact that, as the sample index n of the input x(n) increases, the PCW sample index $m_i$ for the $i^{th}$ cancellation pulse corresponding to the $i^{th}$ peak increases by the oversampling factor M. Based on that fact, the partitioning 1000 results in the N words of the reference PCW being partitioned for storage in the P subset memories 924-934 such that each subset of M rows holds consecutive samples of the reference PCW as a result of the oversampling rate M. Furthermore, across the P subset memories 924-934, the PCW sample indices are separated by the value of M. The example partitioning 1000 illustrated in FIG. 10A is for an example implementation with an oversampling factor of M=4 and a maximum number of peaks of P=6.

Stated another way, in the example partitioning 1000 of FIG. 10A, the respective CP subset memories 924-934 store respective example subsets 1004-1014 of data samples of a single reference PCW, with different CP subset memories 924-934 storing different subsets of the data samples. For example, the first CP subset memory 924 stores example first subsets 1004 of the data samples of the single reference PCW, with the first subsets 1004 including an example subset 1024 and an example subset 1026. Likewise, the second CP subset memory 926 stores example second subsets 1006 of the data samples of the single reference PCW, with the second subsets 1006 including an example subset 1034 and an example subset 1036, and the subsets 1034 and 1036 being different from the subsets 1024 and 1026.

Also, the subsets of data samples stored in a given CP subset memory 924-934 include a number of consecutive data samples of the single reference PCW corresponding to the oversampling factor M. For example, each of the first subsets 1004 stored in the first CP subset memory 924 include a number of consecutive data samples of the single reference PCW corresponding to the oversampling factor M=4. By way of example, the subset 1024 includes the M=4 consecutive data samples h(0), h(1), h(2) and h(3) of the reference PCW, the subset 1026 includes the M=4 consecutive data samples h(24), h(25), h(26) and h(27) of the reference PCW, etc. Likewise, each of the second subsets 1006 stored in the second CP subset memory 926 include a number of consecutive data samples of the single reference PCW corresponding to the oversampling factor M=4. For example, the subset 1034 includes the M=4 consecutive data samples h(4), h(5), h(6) and h(7) of the reference PCW, the subset 1036 includes the M=4 consecutive data samples h(28), h(29), h(30) and h(37) of the reference PCW, etc.

Furthermore, adjacent subsets of data samples stored in a given CP subset memory 924-934 are separated by a number of consecutive data samples of the single reference PCW corresponding to a product of the oversampling factor M and the total number of output cancellation pulses P capable of being generated by the cancellation pulse generation circuitry 705. For example, adjacent subsets of the first subsets 1004 stored in the first CP subset memory 924 are separated by a number of consecutive data samples of the single reference PCW corresponding to a function (e.g., a product) of the oversampling factor M=4 and the total number of output cancellation pulses P=6 capable of being generated by the cancellation pulse generation circuitry 705, such as 4*6=24 samples in the illustrated example. By way of example, the data samples h(0), h(1), h(2) and h(3) of the initial subset 1024 of the first subsets 1004 are separated from the data samples h(24), h(25), h(26) and h(27) of the next adjacent subset 1026 of the first subsets 1004 by 4*6=24 consecutive samples. Likewise, adjacent subsets of the second subsets 1006 stored in the second CP subset memory 926 are separated by a number of consecutive data samples of the single reference PCW corresponding to function (e.g., a product) of the oversampling factor M=4 and the total number of output cancellation pulses P=6 capable of being generated by the cancellation pulse generation circuitry 705, such as 4*6=24 samples in the illustrated example. For example, the data samples h(4), h(5), h(6) and h(7) of the initial subset 1034 of the second subsets 1006 are separated from the data samples h(28), h(29), h(30) and h(31) of the next adjacent subset 1036 of the second subsets 1006 by 4*6=24 consecutive samples.

Moreover, respective subsets of data samples in adjacent accessed ones of the CP subset memories 924-934 are separated by a number of consecutive data samples of the single reference PCW corresponding to the oversampling factor M. For example, the data samples h(0), h(1), h(2) and h(3) of the subset 1024 of the first subsets 1004 are separated from the respective data samples h(4), h(5), h(6) and h(7) of the subset 1034 of the second subsets 1006 by M=4 consecutive data samples. Likewise, the data samples h(24), h(25), h(26) and h(27) of the subset 1026 of the first subsets

1004 are separated from the respective data samples h(28), h(29), h(30) and h(31) of the subset 1036 of the second subsets 1006 by M=4 consecutive data samples. Furthermore, the subset 1034 of the second subsets 1006 includes data samples of the single reference PCW beginning with a sample index (e.g., n'=4 in the illustrated example) corresponding to the oversampling factor M (e.g., which is M=4 in the illustrated example). In the illustrated example, one of the CP subset memories 924-934 is considered adjacent to another of the CP subset memories 924-934 if they store consecutive subsets of data samples that satisfy the preceding property regardless of their physical circuit location. In some examples, memory identifiers are used to label the CP subset memories 924-934 such that adjacent subset memories have memory identifiers that are consecutive (e.g., separated by a value of one). For example, in FIG. 10A, the CP subset memories 924-934 are labeled with respective memory identifiers 1, 2, 3, etc., such that subset memories having identifiers that differ by a value of one are adjacent.

Because the data samples of the single reference PCW stored in the CP subset memories 924-934 are oversampled by the oversampling factor M=4, for a given peak with a location time index $\tau_i$, sample indices corresponding to just one of the M poly phases of the single reference PCW will be selected by the respective CP index generation circuitry 810-820 for use in generating the cancellation pulse for that peak. Also, to output the cancellation pulse for that given peak with the location time index $\tau_i$, successive data samples of the PCW will be read from successive ones of the CP subset memories 924-934 until the $P^{th}$ CP subset memory read, after which data samples will begin being read from the next subset of data samples in the first CP subset memory, and so on. The CP memory access controller circuitry 940 utilizes this behavior to transform the vector of up to P distinct PCW sample indices $\{m_1, m_2, \ldots, m_P\}$, which correspond to the up to P cancellation pulses to be generated, to a new set of P subset memory indices (also referred to as subset memory sample indices) $\{k_1, k_2, \ldots, k_P\}$, such that the corresponding PCW data samples $\{h(k_1), h(k_2), \ldots, h(k_P)\}$ are accessed based on those subset memory indices from different ones of the CP subset memories 924-934, with $k_1$ indexing the first CP subset memory 924, $k_2$ indexing the second CP subset memory 926, and so on, with $k_P$ indexing the $P^{th}$ CP subset memory 934.

The following are two example algorithms implemented by the cancellation pulse readout circuitry 905 of FIG. 9 to read out PCW data samples from the CP subset memories 924-934 in parallel to generate up to P cancellation pulses to cancel, or reduce, up to P peaks, or crests, in the input signal x(n).

A first example algorithm implemented by the cancellation pulse readout circuitry 905 reads out an individual (single) PCW samples for each of up to P cancellation pulses in parallel from the CP subset memories 924-934. The first example algorithm begins after a first peak is detected by the peak detection circuitry 530 in the input signal x(n). As described above, the first CP index generation circuitry 810 generates an initial PCW sample index $m_1(n)$ based on Equation 1 and the location time index $\tau_i$ for that peak. As described above, the PCW sample index $m_1(n)$ identifies the first sample $h(m_1(n))$ of the reference PCW that is to be read from memory to generate the corresponding cancellation pulse for that first peak.

The first CP index generation circuitry 810 provides the PCW sample index $m_1(n)$ to the CP memory access controller circuitry 940, as shown in FIG. 9. Because the PCW sample index $m_1(n)$ corresponds to the first detected peak, none of the CP subset memories 924-934 are presently being accessed. As such, the CP memory access controller circuitry 940 sets the first CP subset memory index $k_1(n)$ for the first CP subset memory 924 based on the access requirements of the generated sample index $m_1(n)$, which is used to access an initial data sample of the reference PCW that begins generation of the cancellation pulse corresponding to this first detected peak. For example, the CP memory access controller circuitry 940 transforms the generated sample index $m_1(n)$ to the first CP subset memory $k_1(n)$ using Equation 2, which is:

$$k_1(n) = \lfloor m_1(n)/MP \rfloor * M + f \qquad \text{Equation 2}$$

In Equation 2, f is the poly phase index of the current peak, which can have values ranging from 0 to M−1, and $\lfloor \ \rfloor$ is the floor operator. Thus, the first CP subset memory $k_1(n)$, which corresponds to generated sample index $m_1(n)$, will point to one of the poly phases of the first subset 1024 of data samples stored in the first CP subset memory 924 because those data samples correspond to the start of the reference PCW. Furthermore, the CP generation control circuitry 955 sets the readout delay $\delta 1$ of the first FIFO in the buffer circuitry 950, which is labeled $FIFO_1$ in FIG. 9, to be 1=P to set the baseline delay of the buffer circuitry 950 equal to the maximum number of cancellation pulses P capable of being generated by the cancellation pulse readout circuitry 905.

For subsequent input sample indices (n+1), (n+2), . . . and so on, the CP memory access controller circuitry 940 sets the CP subset memory indices for the next CP subset memories 926-934 to be accessed to obtain the next data samples of the reference PCW to be used to generate the cancellation pulse corresponding to this first detected peak. For example, the CP memory access controller circuitry 940 sets $k_2(n+1)=k_1(n)$ to access the second CP subset memory 926 at the next sample index (n+1), sets $k_3(n+2)=k_1(n)$ to access the third CP subset memory 928 at the subsequent sample index (n+2), and so on. As such, each successive data sample of the reference PCW will be accessed from the next adjacent CP subset memory 924-934 due to the storage arrangement shown in FIG. 10A, and will revert back to the CP subset memory 924 after the last CP subset memory 934 is accessed. The CP memory output circuitry 945 writes the accessed data samples to the $FIFO_1$ buffer of the buffer circuitry 950. The $FIFO_1$ buffer of the buffer circuitry 950 will output the PCW samples $\{h(m_1(n)), h(m_i(n+1)), \ldots\}$ corresponding to the first cancellation pulse for the first detected peak based on the configured delay $\delta 1$=P.

Next, assume a second peak is detected by the peak detection circuitry 530 in the input signal x(n). After the second peak is detected, the CP memory access controller circuitry 940 performs a check to determine if the current sample index $m_1(n)$ for the first peak and the new index $m_2(n)$ determined by the CP index generation circuitry 810 for the second peak would point to data sample(s) in the first CP subset memory 924 (because the new index $m_2(n)$ will initially point to one of the poly phases of the first subset 1024 of data samples stored in the first CP subset memory 924). If not, the CP memory access controller circuitry 940 sets the first CP subset memory index $k_1(n)$ for the first CP subset memory 924 based on the access requirements of the generated sample index $m_2(n)$, which is used to access an initial data sample of the reference PCW that begins generation the cancellation pulse corresponding to this second detected peak. For example, the CP memory access controller circuitry 940 transforms the generated sample index $m_2(n)$ to the first CP subset memory index $k_1(n)$ using Equation 2 above. Furthermore, the CP generation control circuitry 955 sets the readout delay δ2 of the second FIFO in the buffer circuitry 950, which is labeled $FIFO_2$ in FIG. 9, to be δ2=P, which corresponds to the baseline delay of the buffer circuitry 950.

Because the current sample index $m_1(n)$ for the first peak and the new index $m_2(n)$ for the second peak point to different CP subset memories 924-934 in this scenario, the CP memory access controller circuitry 940 can access the reference PCW samples for the first peak and the second peak from different ones of the CP subset memories 924-934 in parallel. For subsequent input sample indices (n+1), (n+2), . . . and so on, the CP memory access controller circuitry 940 sets the CP subset memory indices for the next CP subset memories 926-934 to be accessed to obtain the next data samples of the reference PCW to be used to generate the cancellation pulse corresponding to this second detected peak, as described above. For example, the CP memory access controller circuitry 940 sets $k_2(n+1)=k_1(n)$ to access the second CP subset memory 926 at the next sample index (n+1), sets $k_3(n+2)=k_1(n)$ to access the third CP subset memory 928 at the subsequent sample index (n+2), and so on. As such, each successive data sample of the reference PCW will be accessed from the next adjacent CP subset memory 924-934 due to the storage arrangement shown in FIG. 10A, and will revert back to the CP subset memory 924 after the last CP subset memory 934 is accessed. Furthermore, for a given next sample index, the CP subset memory 924-934 accessed to obtain the data sample of the reference PCW for the second peak will continue to be different from the CP subset memory 924-934 accessed to obtain the data sample of the reference PCW for the first peak and, thus, the samples for both peaks can be accessed in parallel. The CP memory output circuitry 945 writes the data samples accessed for the second peak to the $FIFO_2$ buffer of the buffer circuitry 950. The $FIFO_2$ buffer of the buffer circuitry 950 will output the PCW samples $\{h(m_2(n)), h(m_2(n+1)), \ldots\}$ corresponding to the second cancellation pulse for the second detected peak based on the configured delay δ2=P.

However, if the current sample index $m_1(n)$ for the first peak and the new index $m_2(n)$ would both access the first CP subset memory 924, the CP memory access controller circuitry 940 delays access to the first CP subset memory 924 for the second peak. The CP memory access controller circuitry 940 does this by setting the first CP subset memory index $k_1(n+1)$ for the next time index based on $m_2(n)$ and using Equation 2. This causes the access of the PCW samples for the second peak to be delayed by one input signal sample. Furthermore, the CP generation control circuitry 955 sets the readout delay δ2 of $FIFO_2$ in the buffer circuitry 950 to δ2=P−1 (which is one input time index less than the baseline delay of the buffer circuitry 950) to compensate for the one sample readout delay introduced by the CP memory access controller circuitry 940.

In this scenario, at the next increment of the input signal's time index, the first CP subset memory index $k_1(n+1)$ for the second peak cancellation pulse will point to a data sample in the first subset 1024 of the first CP subset memory 924, whereas the first peak cancellation pulse will point to a data sample in the second CP subset memory 926. Therefore, the CP memory access controller circuitry 940 can access the two different samples from the two different CP subset memories 924-926 in parallel. Also, the memory access controller circuitry 940 can continue to access the different samples for the first and second cancellation pulses from two different CP subset memories 924-934 in parallel for each successive input time index n. Furthermore, the CP memory output circuitry 945 writes the data samples accessed for the second cancellation pulse to the $FIFO_2$ buffer of the buffer circuitry 950, as described above. In this scenario, the $FIFO_2$ buffer of the buffer circuitry 950 will output the PCW samples $\{h(m_2(n)), h(m_2(n+1)), \ldots\}$ corresponding to the second cancellation pulse for the second detected peak based on the configured delay δ2=P−1.

Next, assume that (i−1) active peaks in the peak cancellation window are being generated by the cancellation pulse readout circuitry 905, and an $i^{th}$ peak is detected by the peak detection circuitry 530 in the input signal x(n). After the $i^{th}$ peak is detected, the CP memory access controller circuitry 940 performs a check to determine if any one of the previous peaks access the first subset memory 924. This is because the new index $m_i(n)$ determined by the $i^{th}$ instance of the CP index generation circuitry 810-820 for the $i^{th}$ peak will initially point to one of the poly phases of the first subset 1024 of data samples stored in the first CP subset memory 924. If not, the CP memory access controller circuitry 940 sets first CP subset memory index, $k_1(n)$ for the first CP subset memory 924 based on the access requirements of the generated sample index $m_i(n)$, which is used to access an initial data sample of the reference PCW that begins generation the cancellation pulse corresponding to this $i^{th}$ detected peak. For example, the CP memory access controller circuitry 940 transforms the generated sample index $m_i(n)$ to the first CP subset memory index $k_1(n)$ using Equation 2 above. Furthermore, the CP generation control circuitry 955 sets the readout delay δi of the $i^{th}$ FIFO in the buffer circuitry 950 to be δi=P, which corresponds to the baseline delay of the buffer circuitry 950.

In this scenario, the indices used to access the PCW samples for the different peaks all point to different CP subset memories 924-934. Thus, the CP memory access controller circuitry 940 can access the reference PCW samples for the initial peaks from different ones of the CP subset memories 924-934 in parallel. For subsequent input sample indices (n+1), (n+2), . . . and so on, the CP memory access controller circuitry 940 sets the CP subset memory indices for the next CP subset memories 926-934 as described above to access the next data samples of the reference PCW to be used to generate the i cancellation pulse corresponding to the $i^{th}$ detected peak. As such, for the new $i^{th}$ peak, each successive data sample of the reference PCW will be accessed from the next adjacent CP subset memory 924-934 due to the storage arrangement shown in FIG. 10A, and will revert back to the CP subset memory 924 after the last CP subset memory 934 is accessed. Furthermore, for a given next sample index, the CP subset memory 924-934 accessed to obtain the data sample of the reference PCW for the $i^{th}$ peak will continue to be different from the CP subset memories 924-934 accessed to obtain the data samples of the reference PCW for the other (i−1) peaks and, thus, the samples for all peaks can be accessed in parallel. The CP memory output circuitry 945 writes the data samples accessed for the $i^{th}$ peak to the $i^{th}$ FIFO buffer of the buffer circuitry 950. The $i^{th}$ FIFO buffer of the buffer circuitry 950 will output the PCW samples $\{h(m_i(n)), h(m_i(n+1)), \ldots\}$ corresponding to the $i^{th}$ cancellation pulse for the $i^{th}$ detected peak based on the configured delay δi=P.

However, if one of the indices for the existing other (i−1) peaks will access the first subset memory 924, the CP memory access controller circuitry 940 computes the maximum number of subsequent samples, represented by the variable L, during which the first subset memory 924 will be continuously accessed for the existing (i−1) peaks. The CP memory access controller circuitry 940 then sets the first CP subset memory sample index $k_1$ after L sample indices, which is $k_1(n+L)$, based on $m_i(n)$ and using Equation 2. This causes the access of the PCW samples for the new $i^{th}$ detected peak to be delayed by L input signal samples. Furthermore, the CP generation control circuitry 955 sets the readout delay δi of $i^{th}$ FIFO buffer in the buffer circuitry 950 to δi=P−L to compensate for the L sample readout delay introduced by the CP memory access controller circuitry 940.

In this scenario, at the $L^{th}$ increment of the input signal's time index, the first CP subset memory index $k_1(n+L)$ will point to a data sample in the first subset 1024 of the first CP subset memory 924, whereas the other peaks' cancellation pulses will point to data samples in different ones of the CP subset memory 926-934 other than the first CP subset memory 924. Therefore, the CP memory access controller circuitry 940 can access the different samples from the different CP subset memories 924-934 in parallel. Also, the memory access controller circuitry 940 can continue to access the different samples for the i different cancellation pulses from different ones of the CP subset memories 924-934 in parallel for each successive input time index n. Furthermore, the CP memory output circuitry 945 writes the data samples accessed for the $i^{th}$ cancellation pulse to the $i^{th}$ FIFO buffer of the buffer circuitry 950, as described above. In this scenario, the $i^{th}$ FIFO buffer of the buffer circuitry 950 will output the PCW samples $\{h(m_i(n)), h(m_i(n+1)), \ldots\}$ corresponding to the $i^{th}$ cancellation pulse for the $i^{th}$ detected peak based on the configured delay δi=P−L.

Note that when a new peak is detected, there will be no more than (P−1) cancellation pulses that are currently being generated by the cancellation pulse readout circuitry 905. The example first algorithm described above ensures that the different cancellation pulses map to different subset memories for all sample indices n.

In the illustrated example, the CP generation control circuitry 955 provides information to the CP memory output circuitry 945 that describes the reordering to be applied to the output samples of the CP subset memories {h(k1), h(k2), . . . , h(kP)} for the current sample index so that the output samples are provided to the correct FIFOs. The CP memory output circuitry 945 writes the reference PCW data samples output from the CP subset memories to the respective FIFOs of the buffer circuitry 950. Based on the delays configured as described above, up to P sample instances may elapse to generate the cancellation pulse for a newly detected peak. Hence, the FIFOs are used to generate the P sample delay, such that the cancellation pulse outputs are time aligned even under the worst-case scenario and have a deterministic latency. The delay of the $i^{th}$ FIFO is programmed by the CP generation control circuitry 955 to $\delta_i$, as described above, so that the FIFOs generate the intended set of cancellation pulses $\{h(m_1), h(m_2), \ldots, h(m_P)\}$ time aligned at their respective outputs.

FIG. 10B illustrates an example operation 1050 of the cancellation pulse readout circuitry 905 included in the cancellation pulse generation circuitry 705 of FIG. 9. In the example operation 1050, the cancellation pulse readout circuitry 905 implements the first example algorithm described above to access the CP subset memories 924-934 with the example partitioning 1000 of FIG. 10A. As such, the example operation 1050 corresponds to an oversampling factor of M=4 and a maximum number of simultaneous peak cancellation pulses of P=6. Furthermore, based on the partitioning 1000 of FIG. 10A, the PCW samples are stored in the P=6 CP subset memories 924-934. Also, $k_1(n)$, $k_2(n)$, . . . $k_6(n)$ are the respective transformed CP subset memory indices 1052 used to access the respective CP subset memories 924-934, and the memory values read out of the CP subset memories 924-934 are stored in the FIFOs of the buffer circuitry 950, as described above.

As described above, when a peak is detected by the peak detection circuitry 530 in the input signal x(n), the CP index generation circuitry 810-820 generates the PCW sample indices corresponding to that peak based on the poly phase of the peak (e.g., 0, 1, 2 or 3 in this example as the oversampling factor is M=4). In the illustrated example of FIG. 10B, the peak detection circuitry 530 detects a first example peak 1054 with an poly phase of 0. The first CP index generation circuitry 810 generates example PCW sample indices 1056 for the first peak to be $m_1(n)$=0, 4, 8, 12, 16, . . . . According to the first example algorithm described above, as this is the first detected peak, the CP generation control circuitry 955 sets the delay of the first FIFO in the buffer circuitry 950, which is labeled $FIFO_1$, in FIG. 10B, to be δ1=P=6 (corresponding to reference numeral 1058 in FIG. 10B). Also, as there are no other peaks being serviced, there is no contention for accessing the CP subset memories 924-934 at this time.

Continuing with the first peak, at the first sample instance when $m_1(n)$=0, the CP memory access controller circuitry 940 performs the first example algorithm described above and assigns $k_1$=0 and the $0^{th}$ location of first CP subset memory 924 is accessed, causing the CP memory output circuitry 945 to read out PCW sample h(0). In the next sample instance, the CP memory access controller circuitry 940 accesses the $0^{th}$ location of the second CP subset memory 926 (which corresponds to the PCW sample index $m_1(n)$=4) by setting $k_2$=0. This continues and the first CP subset memory 924 is accessed again after P=6 clock cycles when $m_1(n)$=24, which corresponds to PCW sample h(24).

When a new peak is detected by the peak detection circuitry 530, the CP memory access controller circuitry 940 performs a check according to the first example algorithm described above to determine if the first CP subset memory 924 is available and a PCW sample can be read out for this new peak without contention with the prior peak. For example, in the operation 1050 of FIG. 10B, the peak detection circuitry 530 detects a second example peak 1060 with an poly phase of 1. The second CP index generation circuitry 815 generates example PCW sample indices 1062 for the second peak to be $m_2(n)$=1, 5, 9, 13, 17, . . . . According to the first example algorithm described above, the CP memory access controller circuitry 940 there will be no contention for accessing h(1) from the first CP subset memory 924 as a different CP subset memory (e.g., the fifth memory 932) will be accessed for the first peak. Thus, the CP memory access controller circuitry 940 assigns $k_1$=1 and the $1^{st}$ location of first CP subset memory 924 is accessed, causing the CP memory output circuitry 945 to read out PCW sample h(1). Also, the CP generation control circuitry 955 sets the delay of the second FIFO in the buffer circuitry 950, which is labeled $FIFO_2$, in FIG. 10B, to be δ2=P=6 (corresponding to reference numeral 1064 in FIG. 10B).

However, if the first CP subset memory 924 is not available, as in the case of the third example peak 1066 detected in the example operation 1050 of FIG. 10B, the CP memory access controller circuitry 940 computes the maximum number of subsequent samples, represented by the variable L, during which the first subset memory 924 will be continuously accessed. In the example of FIG. 10B, the first CP subset memory 924 will be accessed for one sample index for the second peak at time index n=12. Accordingly, the CP memory access controller circuitry 940 determines L=1, which causes the access of the PCW samples for the third peak 1066 to be delayed by one input sample time, as described above. As such, the CP generation control circuitry 955 sets the delay of the third FIFO in the buffer circuitry 950, which is labeled $FIFO_3$, in FIG. 10B, to be $\delta 3=P-1=5$ (corresponding to reference numeral 1068 in FIG. 10B).

A second example algorithm implemented by the cancellation pulse readout circuitry 905 reads out multiple PCW samples for a single cancellation pulse in parallel from the CP subset memories 924-934. In second example algorithm, for a given input sample index n, the CP memory access controller circuitry 940 uses Equation 2 above to determine the CP subset memory index $k_i(n)$ for the $i^{th}$ cancellation pulse corresponding to the $i^{th}$ detected peak based on the initial sample index $m_i(n)$ generated by the $i^{th}$ instance of the CP index generation circuitry 810-820 for the $i^{th}$ peak, as described above. The CP memory access controller circuitry 940 then accesses the CP subset memories 924-934 in parallel to obtain P consecutive PCW samples $\{h(k_i), h(k_i+M), \ldots, h(k_i+PM-M)\}$ corresponding to the $i^{th}$ peak. The CP memory output circuitry 945 then writes the vector of accessed reference PCW samples $\{h(k_i), h(k_i+M), \ldots, h(k_i+PM-M)\}$ from the CP subset memories 924-934 to the $i^{th}$ FIFO of the buffer circuitry 950.

In the next sample index n+1, the CP memory access controller circuitry 940 uses the same procedure to access the P consecutive PCW samples for the $(i+1)^{th}$ cancellation pulse corresponding to the $(i+1)^{th}$ detected peak from the CP subset memories 924-934 in parallel. The CP memory output circuitry 945 then writes the vector of accessed reference PCW samples $\{h(k_{i+1}), h(k_{i+1}+M), \ldots, h(k_{i+1}+PM-M)\}$ from the CP subset memories 924-934 to the $(i+1)^{th}$ FIFO of the buffer circuitry 950. The CP memory access controller circuitry 940 and the CP memory output circuitry 945 repeat the preceding operations in a round-robin fashion to successively obtain P consecutive PCW samples from the CP subset memories 924-934 in parallel for up to P cancellation pulses corresponding to up to P detected peaks. If fewer than P peaks in the peak cancellation window are being generated at any point of time, then the CP subset memories 924-934 are not accessed for few of the sample indices in every set of P sample indices.

Also, assume that cancellation pulses for (i−1) active peaks in the peak cancellation window are currently being generated by the cancellation pulse readout circuitry 905, and the $i^{th}$ peak is detected. In this second example algorithm, the memory access controller circuitry 940 checks to determine if the CP subset memories 924-934 are already being accessed for one of the existing (i−1) cancellation pulses for the current sample instant n. If not, then the memory access controller circuitry 940 access the P consecutive PCW samples $\{h(k_i), h(k_i+M), \ldots, h(k_i+PM-M)\}$ for the $i^{th}$ cancellation pulse corresponding to the $i^{th}$ peak in sample index n. Furthermore, the CP generation control circuitry 955 sets the delay parameter $\delta_i$ for the $i^{th}$ cancellation pulse to 0, where $\delta_i$ represents the initial offset between the write and read pointers of the $i^{th}$ FIFO in the buffer circuitry 950, which is used to output the $i^{th}$ cancellation pulse. Also, the CP generation control circuitry 955 sets the delay of the $i^{th}$ FIFO in the buffer circuitry 950, accordingly.

Otherwise, the memory access controller circuitry 940 computes the maximum number of subsequent samples, represented by the variable L, during which the CP subset memories 924-934 would be continuously accessed. In this example, the P consecutive PCW samples for the $i^{th}$ cancellation pulse corresponding to the $i^{th}$ peak would be accessed by the memory access controller circuitry 940 from the CP subset memories 924-934 at sample instance (n+L). As such, the CP generation control circuitry 955 sets the delay parameter $\delta_i$ for the $i^{th}$ cancellation pulse to L. Also, the CP generation control circuitry 955 sets the delay of the $i^{th}$ FIFO in the buffer circuitry 950, accordingly.

In some examples, the effective length of the reference pulse cancellation waveform can be doubled by designing it to have a conjugate symmetric property such that $h(k)=h^*(2N-k-2)$. In such examples, the N samples $\{h(0), h(1), \ldots, h(N-1)\}$ stored in the CP subset memories 924-934 correspond to one-half of the total PCW. However, to utilize this conjugate symmetry, during generating of a given cancellation pulse, the sample indices of the PCW are decremented once the center sample of the reference PCW is reached.

Such operation can be achieved with the second example algorithm described above as follows. The PCW is stored in the CP subset memories 924-934 such that the center data sample is stored in the last, or $P^{th}$, subset memory 934. In some examples, up to (P−1) zeros are appended to the beginning of the reference PCW to accomplish this. Then, during operation, after the memory access controller circuitry 940 accesses the center PCW sample from the $P^{th}$ subset memory 934, the memory access controller circuitry 940 decrements the indices of the data samples for be read from the CP subset memories 924-934. Also, the CP memory output circuitry 945 flips the order of the vector of P samples being read out of the CP subset memories 924-934 in each sample instant such that the data sample vector $\{h(k_i+PM-M), h(k_i+PM-2M), \ldots, h(k_i)\}$ is written to the $i^{th}$ FIFO in the buffer circuitry 950 instead of the vector $\{h(k_i), h(k_i+M), \ldots, h(k_i+PM-M)\}$. Furthermore, in some examples, if the sample phase offset for the $i^{th}$ peak results in the center data sample of the PCW being read, then the CP generation control circuitry 955 performs a dynamic offset adjustment (e.g., by 1) to either the write pointer or the read pointer so that the center data sample of PCW is not repeated at the output of the $i^{th}$ FIFO.

In some examples, the cancellation pulse readout circuitry 905 includes means for accessing the CP subset memories. For example, the means for accessing the CP subset memories may be implemented by the CP memory access controller circuitry 940. In some examples, the CP memory access controller circuitry 940 may be instantiated by programmable circuitry such as the example programmable circuitry 1412 of FIG. 14. For instance, the CP memory access controller circuitry 940 may be instantiated by the example microprocessor 1500 of FIG. 15 executing machine executable instructions such as those implemented by at least block 1110 of FIG. 11, blocks 1205-1210 of FIG. 12, blocks 1310-1315 of FIG. 13, etc.

Figure 16:
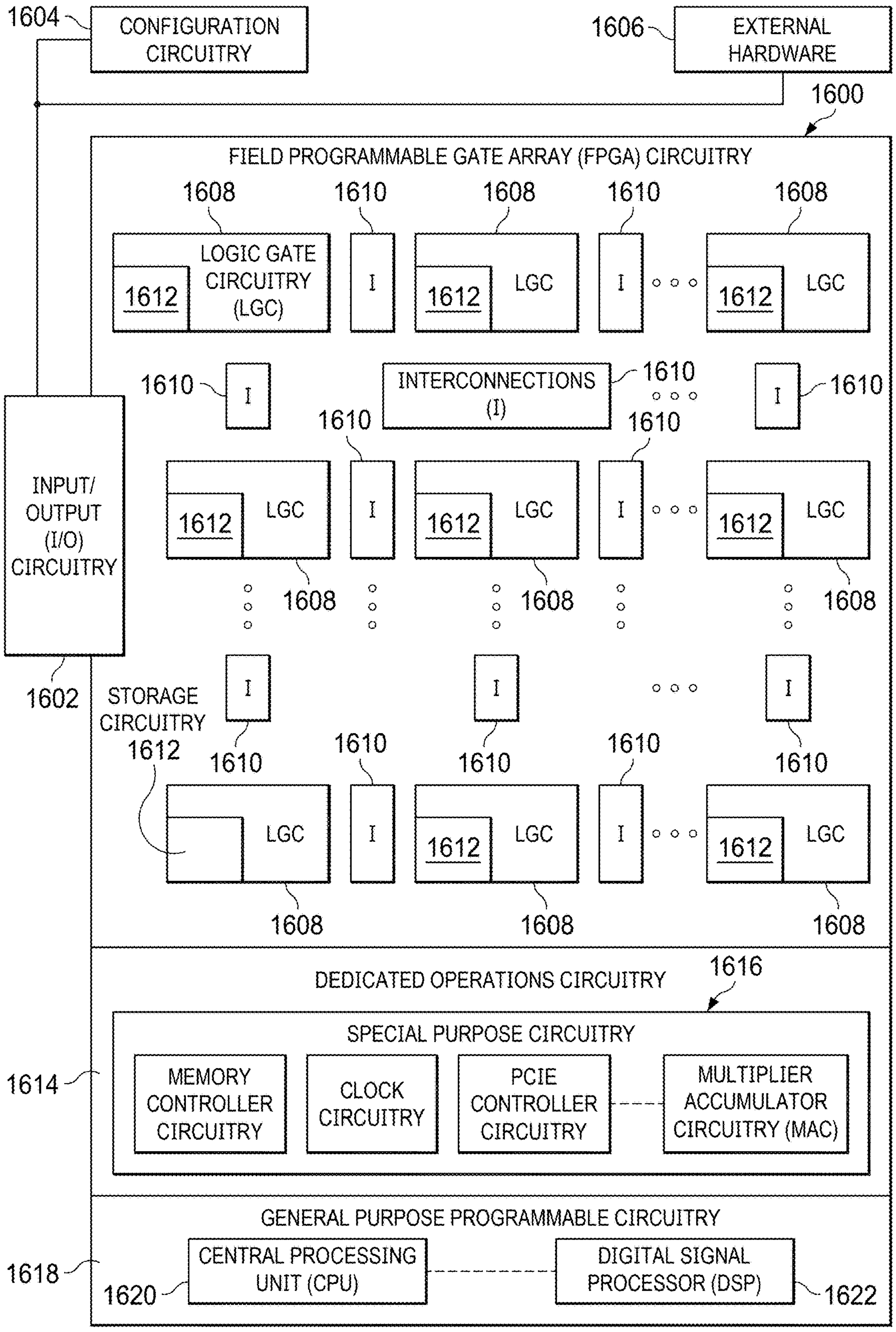
FIG. 16 is a block diagram of another example implementation of the programmable circuitry of FIG. 14.

In some examples, the CP memory access controller circuitry 940 may be instantiated by hardware logic circuitry, which may be implemented by an ASIC, XPU, or the FPGA circuitry 1600 of FIG. 16 configured or structured to perform operations corresponding to the machine-readable instructions. Also, the CP memory access controller circuitry 940 may be instantiated by any other combination of hardware, software, or firmware. For example, the CP memory access controller circuitry 940 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

In some examples, the cancellation pulse readout circuitry 905 includes means for outputting data from the CP subset memories. For example, the means for outputting data from the CP subset memories may be implemented by the CP memory output circuitry 945. In some examples, the CP memory output circuitry 945 may be instantiated by programmable circuitry such as the example programmable circuitry 1412 of FIG. 14. For instance, the CP memory output circuitry 945 may be instantiated by the example microprocessor 1500 of FIG. 15 executing machine executable instructions such as those implemented by at least block 1110 of FIG. 11, block 1220 of FIG. 12, block 1320 of FIG. 13, etc. In some examples, the CP memory output circuitry 945 may be instantiated by hardware logic circuitry, which may be implemented by an ASIC, XPU, or the FPGA circuitry 1600 of FIG. 16 configured or structured to perform operations corresponding to the machine-readable instructions. Also, the CP memory output circuitry 945 may be instantiated by any other combination of hardware, software, or firmware. For example, the CP memory output circuitry 945 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

In some examples, the cancellation pulse readout circuitry 905 includes means for buffering cancellation pulse data. For example, the means for buffering cancellation pulse data may be implemented by the buffer circuitry 950. In some examples, the buffer circuitry 950 may be instantiated by programmable circuitry such as the example programmable circuitry 1412 of FIG. 14. For instance, the buffer circuitry 950 may be instantiated by the example microprocessor 1500 of FIG. 15 executing machine executable instructions such as those implemented by at least block 1115 of FIG. 11. In some examples, the buffer circuitry 950 may be instantiated by hardware logic circuitry, which may be implemented by an ASIC, XPU, or the FPGA circuitry 1600 of FIG. 16 configured or structured to perform operations corresponding to the machine-readable instructions. Also, the buffer circuitry 950 may be instantiated by any other combination of hardware, software, or firmware. For example, the buffer circuitry 950 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

In some examples, the cancellation pulse readout circuitry 905 includes means for controlling cancellation pulse generation. For example, the means for controlling cancellation pulse generation may be implemented by the CP generation control circuitry 955. In some examples, the CP generation control circuitry 955 may be instantiated by programmable circuitry such as the example programmable circuitry 1412 of FIG. 14. For instance, the CP generation control circuitry 955 may be instantiated by the example microprocessor 1500 of FIG. 15 executing machine executable instructions such as those implemented by at least block 1225 of FIG. 12, block 1325 of FIG. 13, etc. In some examples, the CP generation control circuitry 955 may be instantiated by hardware logic circuitry, which may be implemented by an ASIC, XPU, or the FPGA circuitry 1600 of FIG. 16 configured or structured to perform operations corresponding to the machine-readable instructions. Also, the CP generation control circuitry 955 may be instantiated by any other combination of hardware, software, or firmware. For example, the CP generation control circuitry 955 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

While an example manner of implementing the cancellation waveform generation circuitry 540 is illustrated in FIGS. 7 and 9, one or more of the elements, processes, or devices illustrated in FIGS. 7 and 9 may be combined, divided, re-arranged, omitted, eliminated, or implemented in any other way. Further, the cancellation pulse generation circuitry 705, the scaling circuitry 710-720, the summation circuitry 725, CP index generation circuitry 810-820, the cancellation pulse readout circuitry 905, the CP subset memories 924-934, the CP memory access controller circuitry 940, the CP memory output circuitry 945, the buffer circuitry 950, the CP generation control circuitry 955 or, more generally, the example cancellation waveform generation circuitry 540 of FIGS. 7 and 9 may be implemented by hardware alone or by hardware in combination with software or firmware. Thus, for example, any of the cancellation pulse generation circuitry 705, the scaling circuitry 710-720, the summation circuitry 725, CP index generation circuitry 810-820, the cancellation pulse readout circuitry 905, the CP subset memories 924-934, the CP memory access controller circuitry 940, the CP memory output circuitry 945, the buffer circuitry 950, the CP generation control circuitry 955 or, more generally, the example cancellation waveform generation circuitry 540 could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, the example cancellation waveform generation circuitry 540 may include one or more elements, processes, or devices in addition to, or instead of, those illustrated in FIGS. 7 and 9, or may include more than one of any or all of the illustrated elements, processes and devices.

Figure 11:
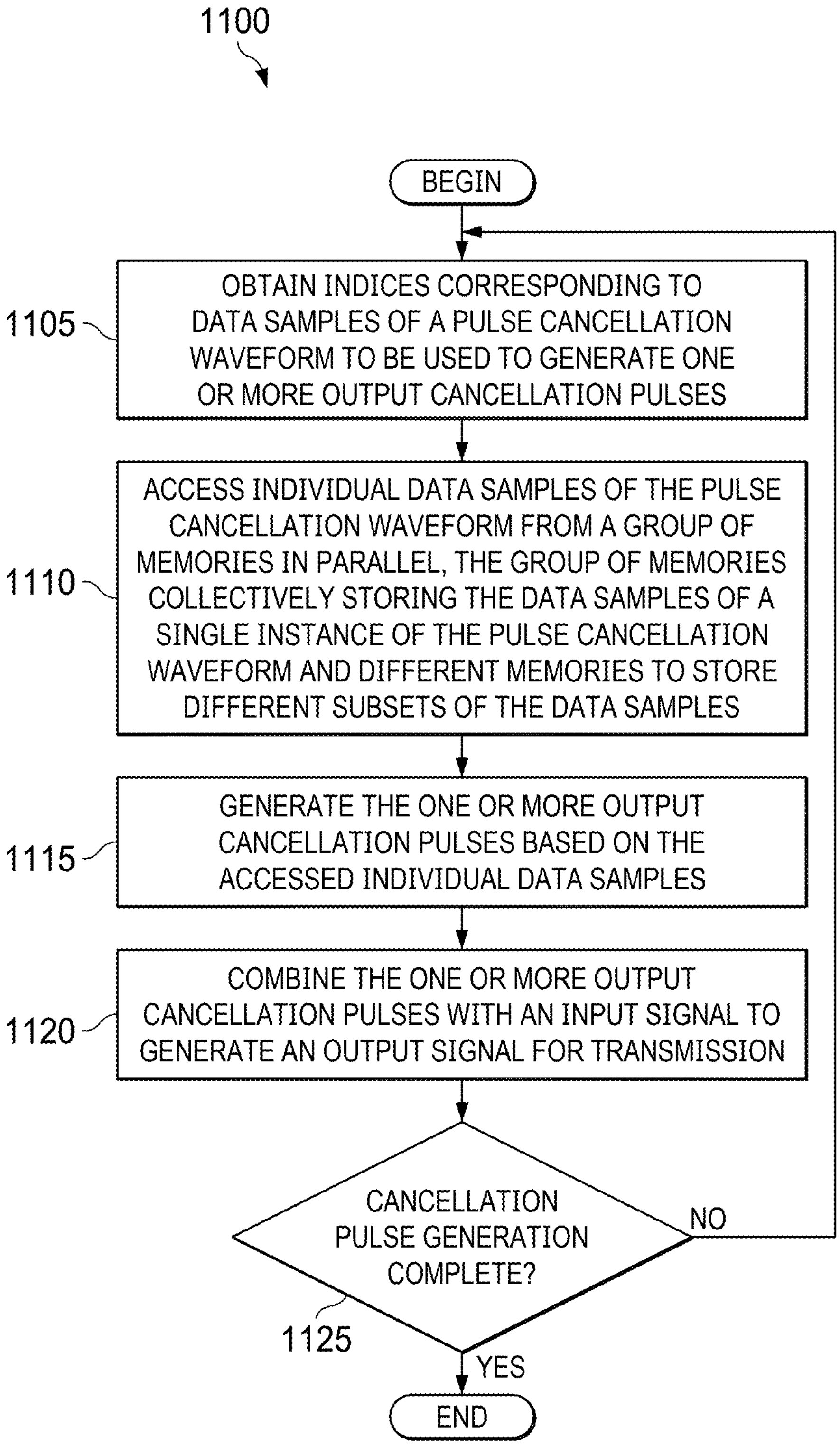
FIGS. 11-13 are flowcharts representative of example machine-readable instructions or example operations that may be executed, instantiated, or performed by example programmable circuitry to implement the cancellation waveform generation circuitry of FIGS. 7 and 9.
Figure 12:
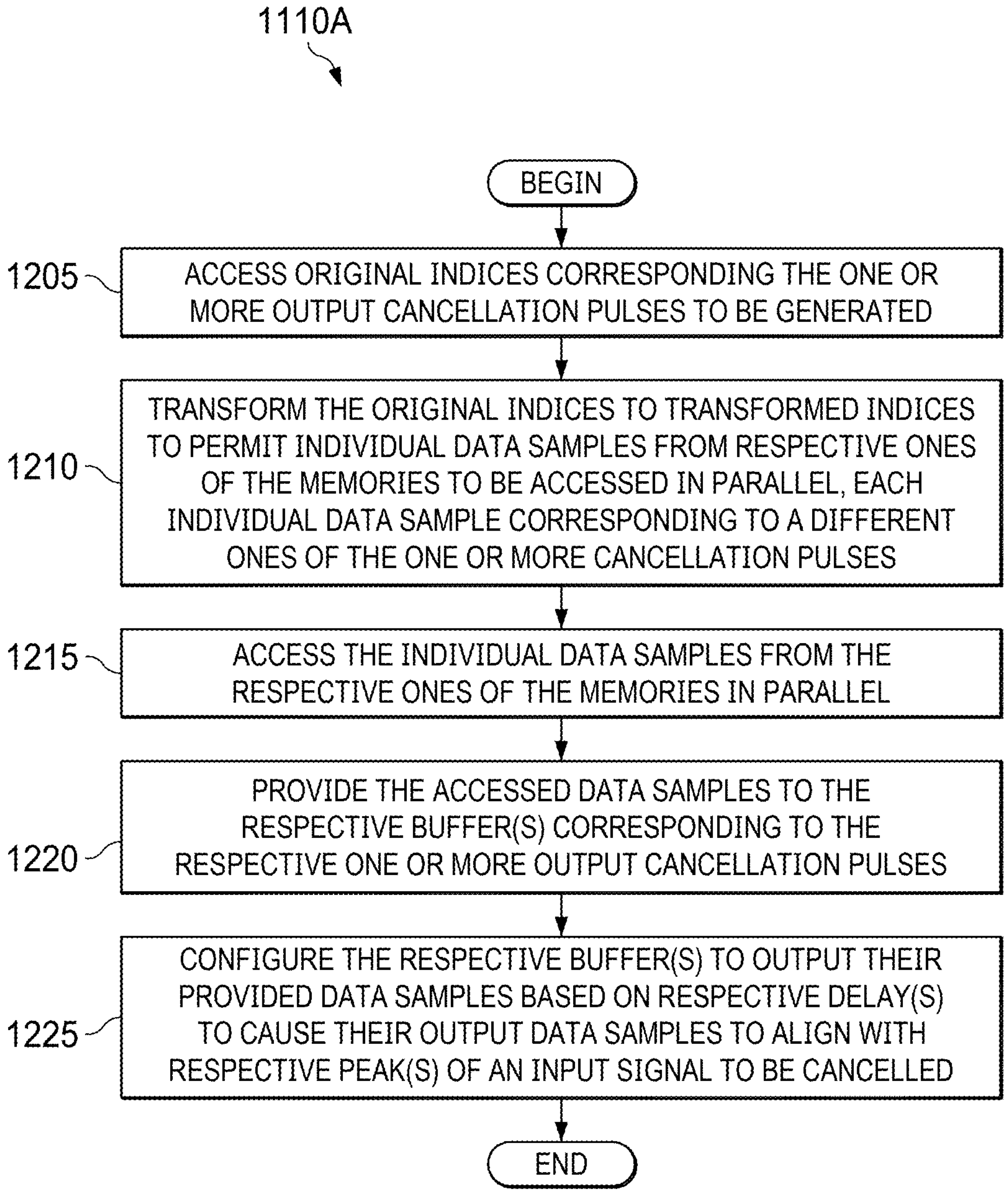
Figure 13:
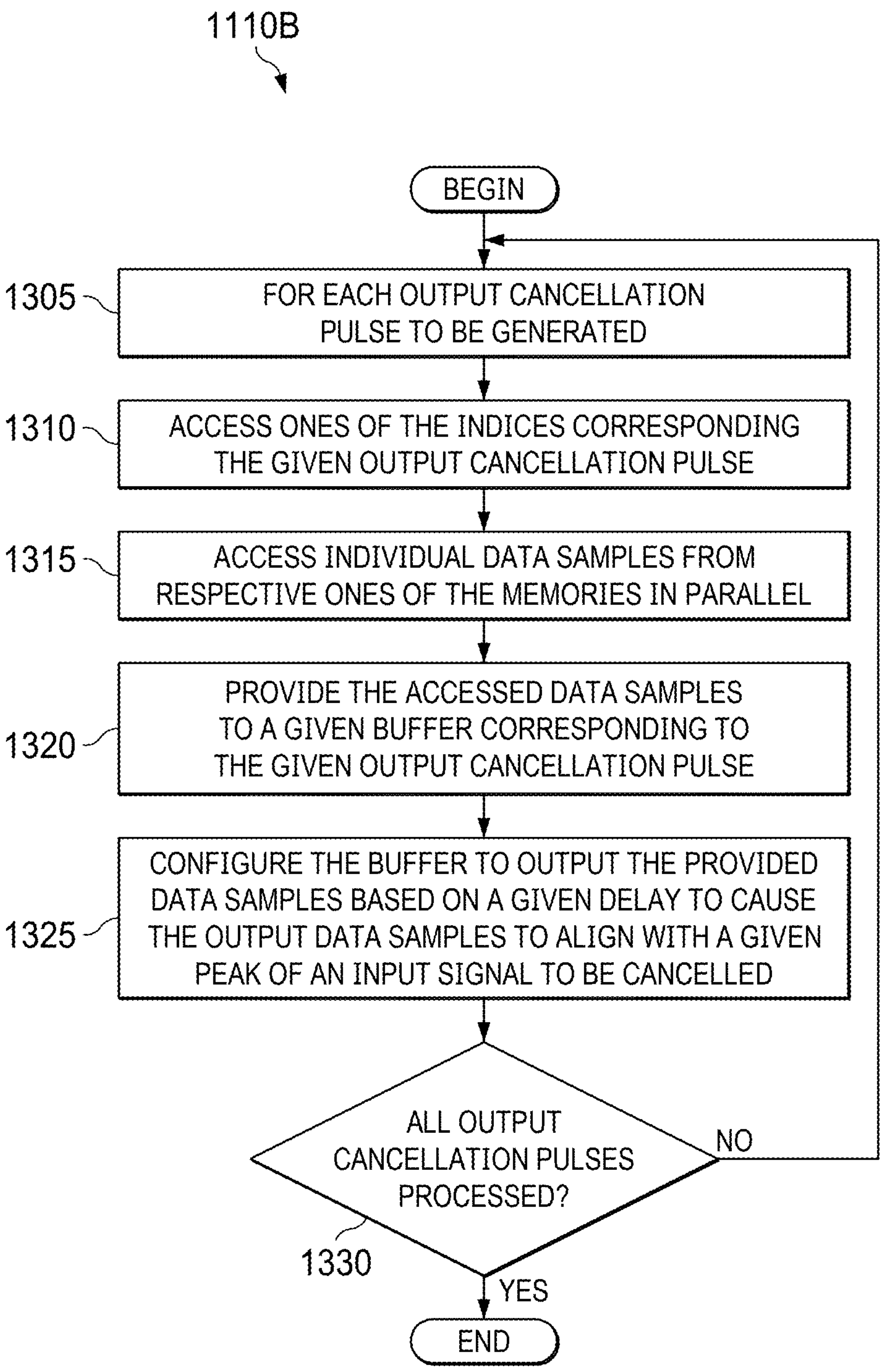

Flowchart(s) representative of example machine-readable instructions, which may be executed by programmable circuitry to implement or instantiate the cancellation waveform generation circuitry 540 of FIGS. 7 and 9 or representative of example operations which may be performed by programmable circuitry to implement or instantiate the cancellation waveform generation circuitry 540 of FIGS. 7 and 9, are shown in FIGS. 11-13. The machine-readable instructions may be one or more executable programs or portion(s) of one or more executable programs for execution by programmable circuitry such as the programmable circuitry 1412 shown in the example processor platform 1400 described below in connection with FIG. 14 or may be one or more function(s) or portion(s) of functions to be performed by the example programmable circuitry (e.g., an FPGA) described below in connection with FIG. 15 or 16. In some examples, the machine-readable instructions cause an operation, a task, etc., to be carried out or performed in an automated manner in the real world. As used herein, "automated" means without human involvement.

The program may be embodied in instructions (e.g., software or firmware) stored on one or more non-transitory computer-readable or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), or any other storage device or storage disk. The instructions of the non-transitory computer-readable or machine-readable medium may program or be executed by programmable circuitry located in one or more hardware devices, but the entire program or parts thereof could also be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with a human or machine user) or an intermediate client hardware device gateway (e.g., a radio access network (RAN)) that may facilitate communication between a server and an endpoint client hardware device. Similarly, the non-transitory computer-readable storage medium may include one or more mediums.

Further, although the example program is described with reference to the flowchart(s) illustrated in FIGS. 11-13, many other methods of implementing the example cancellation waveform generation circuitry 540 may also be used. For example, the order of execution of the blocks of the flowchart(s) may be changed, or some of the blocks described may be changed, eliminated, or combined. Also, any or all of the blocks of the flow chart may be implemented by one or more hardware circuits (e.g., processor circuitry, discrete or integrated analog or digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine executable instructions. For example, the machine-readable instructions may be fragmented and stored on one or more storage devices, disks or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, or executable by a computing device or other machine. For example, the machine-readable instructions may be stored in multiple parts, which are individually compressed, encrypted, or stored on separate computing devices, wherein the parts when decrypted, decompressed, or combined form a set of computer-executable or machine executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer-readable or machine-readable media, as used herein, may include instructions or program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, Csharp, Perl, Python, JavaScript, HyperText Markup Language (HTML), Structured Query Language (SQL), Swift, etc.

As mentioned above, the example operations of FIGS. 11-13 may be implemented using executable instructions (e.g., computer-readable or machine-readable instructions) stored on one or more non-transitory computer-readable or machine-readable media. As used herein, the terms non-transitory computer-readable medium, non-transitory computer-readable storage medium, non-transitory machine-readable medium, or non-transitory machine-readable storage medium are expressly defined to include any type of computer-readable storage device or storage disk and to exclude propagating signals and to exclude transmission media. Examples of such non-transitory computer-readable medium, non-transitory computer-readable storage medium, non-transitory machine-readable medium, or non-transitory machine-readable storage medium include optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, or for caching of the information). As used herein, the terms "non-transitory computer-readable storage device" and "non-transitory machine-readable storage device" are defined to include any physical (mechanical, magnetic or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, or redundant array of independent disks (RAID) systems. As used herein, the term "device" refers to physical structure such as mechanical or electrical equipment, hardware, or circuitry that may or may not be configured by computer-readable instructions, machine-readable instructions, etc., or manufactured to execute computer-readable instructions, machine-readable instructions, etc.

FIG. 11 is a flowchart representative of example machine-readable instructions or example operations 1100 that may be executed, instantiated, or performed by programmable circuitry to implement the cancellation waveform generation circuitry 540 of FIGS. 7 and 9. The example machine-readable instructions or the example operations 1100 of FIG. 11 begin at block 1105, at which the CP memory access controller circuitry 940 obtains sample indices from the CP index generation circuitry 810-820. As described above, the sample indices correspond to data samples of a PCW to be used to generate one or more output cancellation pulses corresponding to one or more detected peaks in the input signal x(n).

At block 1110, the CP memory access controller circuitry 940 accesses individual samples of the reference PCW from the group of CP subset memories 924-934 in parallel. As described above, the group of CP subset memories 924-934 collectively store a single instance of the PCW and different ones of the CP subset memories 924-934 store different subsets of the data samples of the reference PCW. At block 1110, the CP memory output circuitry 945 also provides the accessed samples of the reference PCW to the FIFO buffers of the buffer circuitry 950, as described above.

At block 1115, the FIFO buffers of the buffer circuitry 950 output their respective PCW samples to generate the one or more cancellation pulses, as described above.

At block 1120, the scaling circuitry 710-720 and the summation circuitry 725 combine the one or more cancellation pulses generated at block 1115 to generate the overall pulse cancellation signal sample z(n), as described above. Furthermore, the overall pulse cancellation signal sample z(n) is combined with the input sample x(n) (e.g., by the compensation circuitry 545) to generate the modified signal r(n) for transmission, as described above. If cancellation pulse generation is complete (block 1125), the machine-readable instructions or the example operations 1100 end. Otherwise, processing returns to block 1105 and blocks subsequent thereto to allow cancellation pulse generation to continue.

FIG. 12 is a flowchart representative of example machine-readable instructions or example operations 1110A that may be executed, instantiated, or performed by programmable circuitry to implement the processing at block 1110 of FIG. 11 based on the first example algorithm described above. The example machine-readable instructions or the example operations 1100A of FIG. 12 begin at block 1205, at which the CP memory access controller circuitry 940 accesses original sample indices $\{m_1, m_2, \ldots, m_P\}$ corresponding to one or more cancellation pulses (e.g., up to P) to be generated, as described above.

At block 1210, the CP memory access controller circuitry 940 transforms the original sample indices $\{m_1, m_2, \ldots, m_P\}$ to transformed indices, also referred to as transformed CP subset memory indices, $\{k_1, k_2, \ldots, k_P\}$ based on the first example algorithm, as described above. The transformed indices $\{k_1, k_2, \ldots, k_P\}$ permit individual data samples from respective ones of the CP subset memories 924-934 to be accessed in parallel, with each individual data sample corresponding to a different one of the cancellation pulse(s) to be generated, as further described above.

At block 1215, the CP memory access controller circuitry 940 uses the transformed indices $\{k_1, k_2, \ldots, k_P\}$ to access the individual data samples from the respective ones of the CP subset memories 924-934 in parallel, as described above.

At block 1220, the CP memory output circuitry 945 outputs the respective individual data samples accessed at block 1215 to the respective FIFO buffer(s) (of the buffer circuitry 950) corresponding to the respective cancellation pulse(s) to be generated, as described above.

At block 1225, the CP generation control circuitry 955 configures the FIFO buffer(s) of the buffer circuitry 950 with respective delays to cause the FIFO buffer(s) to output their respective data samples (which correspond to the respective cancellation pulse(s)) to align with the respective peak(s) to be cancelled in the input signal, as described above. The example machine-readable instructions or the example operations 1110A then end.

FIG. 13 is a flowchart representative of example machine-readable instructions or example operations 1110B that may be executed, instantiated, or performed by programmable circuitry to implement the processing at block 1110 of FIG. 11 based on the second example algorithm described above. The example machine-readable instructions or the example operations 1100B of FIG. 13 begin at block 1305, at which the CP memory access controller circuitry 940 begins generating data samples for one or more cancellation pulses in a round-robin manner. At block 1310, the CP memory access controller circuitry 940 accesses sample indices identifying PCW samples to be accessed for a first cancellation pulse to be generated, as described above. At block 1315, the CP memory access controller circuitry 940 uses the sample indices to access P consecutive PCW samples for that given cancellation pulse from the CP subset memories 924-934 in parallel, as described above. At block 1320, the CP memory output circuitry 945 provides the P consecutive PCW samples accessed at block 1315 to the given FIFO buffer of the buffer circuitry 950 that corresponds to the given cancellation pulse being generated, as described above. At block 1325, the CP generation control circuitry 955 configures that FIFO buffer to output its stored data samples based on a delay that is to cause the data samples to align with the given peak of the input signal to be cancelled with that cancellation pulse. At block 1330, the CP memory access controller circuitry 940 continues processing of the cancellation pulses in a round-robin manner. The example machine-readable instructions or the example operations 1100B then end.

Figure 14:
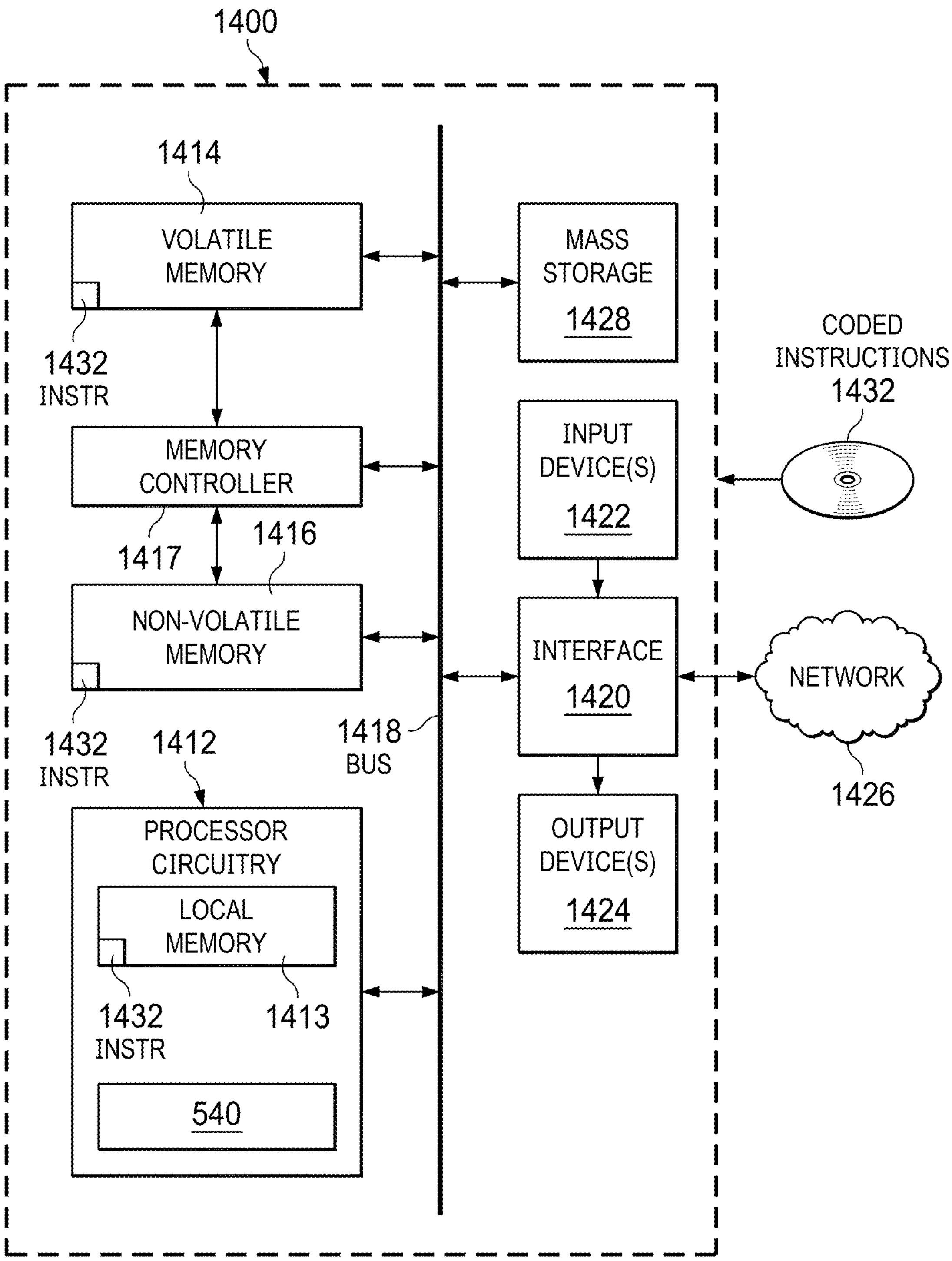
FIG. 14 is a block diagram of an example processing platform including programmable circuitry structured to execute, instantiate, or perform the example machine-readable instructions or perform the example operations of FIGS. 11-13 to implement the cancellation waveform generation circuitry of FIGS. 7 and 9.

FIG. 14 is a block diagram of an example programmable circuitry platform 1400 structured to execute or instantiate the example machine-readable instructions or the example operations of FIGS. 11-13 to implement the cancellation waveform generation circuitry 540 of FIGS. 7 and 9. The programmable circuitry platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, or microcontrollers from any desired family or manufacturer. The programmable circuitry 1412 may be implemented by one or more semiconductor based (e.g., silicon based) devices. In this example, the programmable circuitry 1412 implements the cancellation pulse generation circuitry 705, the scaling circuitry 710-720, the summation circuitry 725, CP index generation circuitry 810-820, the cancellation pulse readout circuitry 905, the CP subset memories 924-934, the CP memory access controller circuitry 940, the CP memory output circuitry 945, the buffer circuitry 950, the CP generation control circuitry 955 or, more generally, the cancellation waveform generation circuitry 540 of FIGS. 7 and 9.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), or any other type of RAM device. The non-volatile memory 1416 may be implemented by flash memory or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware using any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

In the illustrated example, one or more input devices 1422 are connected to the interface circuitry 1420. The input device(s) 1422 permit(s) a user (e.g., a human user, a machine user, etc.) to enter data or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 1420 of the illustrated example, thus, may include a graphics driver card, a graphics driver chip, or graphics processor circuitry such as a GPU.

The interface circuitry 1420 of the illustrated example also includes a communication device such as a transmitter, a receiver, a transceiver, a modem, a residential gateway, a wireless access point, or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices or SSDs.

The machine-readable instructions 1432, which may be implemented by the machine-readable instructions of FIGS. 11-13, may be stored in the mass storage device 1428, in the volatile memory 1414, in the non-volatile memory 1416, or on at least one non-transitory computer-readable storage medium such as a CD or DVD which may be removable.

Figure 15:
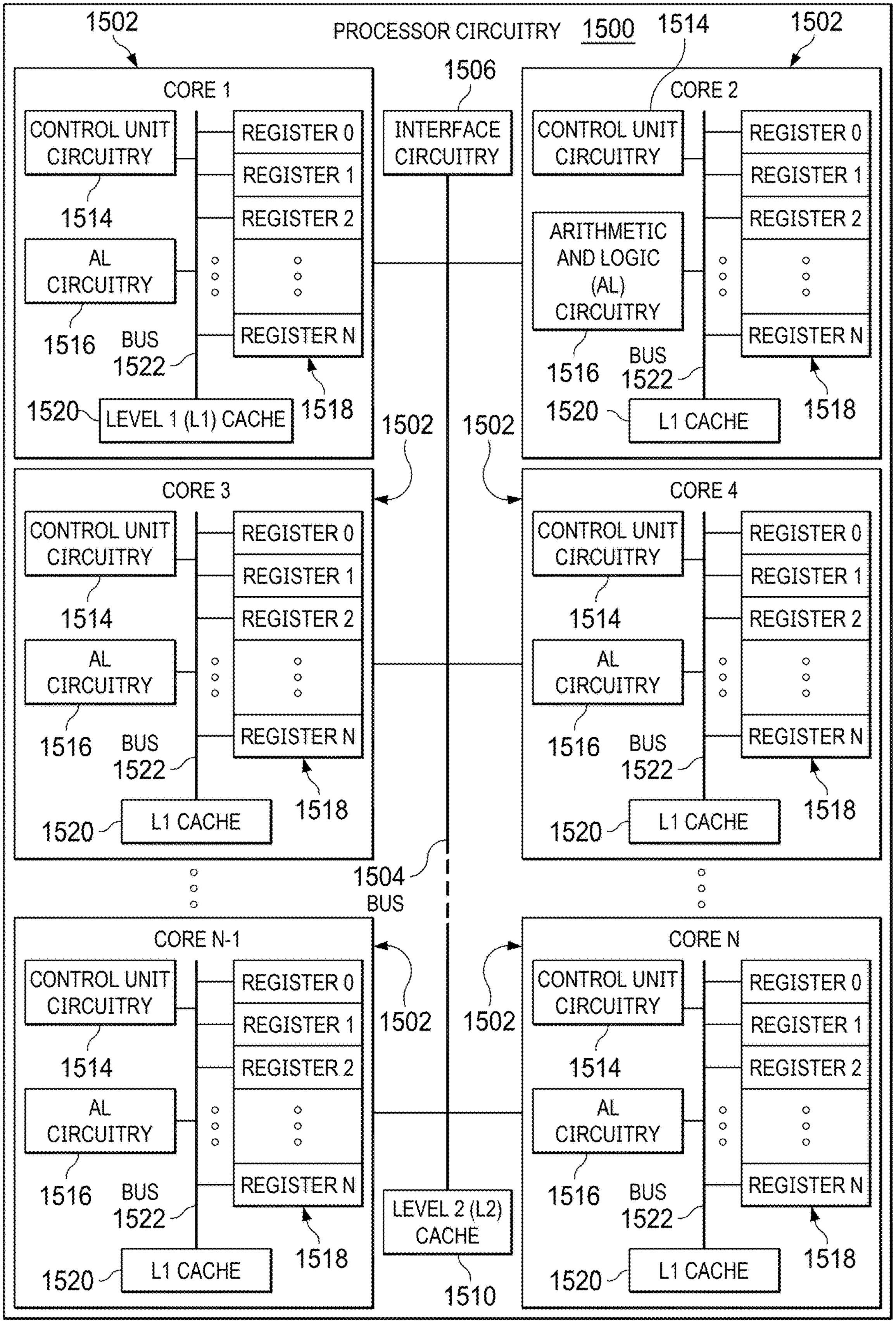
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general-purpose microprocessor (e.g., general-purpose microprocessor circuitry). The microprocessor 1500 executes some or all of the machine-readable instructions of the flowcharts of FIGS. 11-13 to effectively instantiate the circuitry of FIG. 2 as logic circuits to perform operations corresponding to those machine-readable instructions. In some such examples, the circuitry of FIGS. 7 and 9 is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine-readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine-readable instructions or operations represented by the flowcharts of FIGS. 11-13.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Also, the first bus 1504 may be implemented by any other type of computing or electrical bus. The cores 1502 may obtain data, instructions, or signals from one or more external devices by example interface circuitry 1506. The cores 1502 may output data, instructions, or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data or instructions. Data or instructions may be transferred (e.g., shared) by writing to or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). For example, higher levels of memory in the hierarchy may exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic or logic operations on the data within the corresponding core 1502. The AL circuitry 1516 of some examples performs integer based operations. In other examples, the AL circuitry 1516 also performs floating-point operations. In yet other examples, the AL circuitry 1516 may include first AL circuitry that performs integer-based operations and second AL circuitry that performs floating-point operations. In some examples, the AL circuitry 1516 may be referred to as an Arithmetic Logic Unit (ALU).

The registers 1518 are semiconductor-based structures to store data or instructions such as results of one or more of the operations performed by the AL circuitry 1516 of the corresponding core 1502. For example, the registers 1518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1518 may be arranged in a bank as shown in FIG. 15. Also, the registers 1518 may be organized in any other arrangement, format, or structure, such as by being distributed throughout the core 1502 to shorten access time. The second bus 1522 may be implemented by at least one of an I2C bus, a SPI bus, a PCI bus, or a PCIe bus.

Each core 1502 or, more generally, the microprocessor 1500 may include other structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) or other circuitry may be present. The microprocessor 1500 is a semiconductor device fabricated to include many transistors interconnected to implement the structures described above in one or more integrated circuits (ICs) contained in one or more packages.

The microprocessor 1500 may include or cooperate with one or more accelerators (e.g., acceleration circuitry, hardware accelerators, etc.). In some examples, accelerators are implemented by logic circuitry to perform certain tasks more quickly or efficiently than can be done by a general-purpose processor. Examples of accelerators include ASICs and FPGAs such as those described herein. A GPU, DSP or other programmable device can also be an accelerator. Accelerators may be on-board the microprocessor 1500, in the same chip package as the microprocessor 1500 or in one or more separate packages from the microprocessor 1500.

FIG. 16 is a block diagram of another example implementation of the programmable circuitry 1412 of FIG. 14. In this example, the programmable circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine-readable instructions. However, once configured, the FPGA circuitry 1600 instantiates the operations or functions corresponding to the machine-readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine-readable instructions represented by the flowchart(s) of FIGS. 11-13 but whose interconnections and logic circuitry are fixed once fabricated), the FPGA circuitry 1600 of the example of FIG. 16 includes interconnections and logic circuitry that may be configured, structured, programmed, or interconnected in different ways after fabrication to instantiate, for example, some or all of the operations/functions corresponding to the machine-readable instructions represented by the flowchart(s) of FIGS. 11-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software or firmware) represented by the flowchart(s) of FIGS. 11-13. As such, the FPGA circuitry 1600 may be configured or structured to effectively instantiate some or all of the operations/functions corresponding to the machine-readable instructions of the flowchart(s) of FIGS. 11-13 as dedicated logic circuits to perform the operations/functions corresponding to those software instructions in a dedicated manner analogous to an ASIC. Therefore, the FPGA circuitry 1600 may perform the operations/functions corresponding to the some or all of the machine-readable instructions of FIGS. 11-13 faster than the general-purpose microprocessor can execute the same.

In the example of FIG. 16, the FPGA circuitry 1600 is configured or structured in response to being programmed (or reprogrammed one or more times) based on a binary file. In some examples, the binary file may be compiled or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access or load the binary file to cause the FPGA circuitry 1600 of FIG. 16 to be configured or structured to perform the one or more operations/functions. For example, the binary file may be implemented by a bit stream (e.g., one or more computer-readable bits, one or more machine-readable bits, etc.), data (e.g., computer-readable data, machine-readable data, etc.), or machine-readable instructions accessible to the FPGA circuitry 1600 of FIG. 16 to cause configuration or structuring of the FPGA circuitry 1600 of FIG. 16, or portion(s) thereof.

In some examples, the binary file is compiled, generated, transformed, or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, or otherwise output from the uniform software platform based on the second instructions. In some examples, the FPGA circuitry 1600 of FIG. 16 may access or load the binary file to cause the FPGA circuitry 1600 of FIG. 16 to be configured or structured to perform the one or more operations/functions. For example, the binary file may be implemented by a bit stream (e.g., one or more computer-readable bits, one or more machine-readable bits, etc.), data (e.g., computer-readable data, machine-readable data, etc.), or machine-readable instructions accessible to the FPGA circuitry 1600 of FIG. 16 to cause configuration or structuring of the FPGA circuitry 1600 of FIG. 16, or portion(s) thereof.

The FPGA circuitry 1600 of FIG. 16, includes example input/output (I/O) circuitry 1602 to obtain or output data to/from example configuration circuitry 1604 or external hardware 1606. For example, the configuration circuitry 1604 may be implemented by interface circuitry that may obtain a binary file, which may be implemented by a bit stream, data, or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine-readable instructions of FIGS. 11-13 or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 or an example DSP 1622. Other general purpose programmable circuitry 1618 may also be present such as a GPU, an XPU, etc., that can be programmed to perform other operations.

Although FIGS. 15 and 16 illustrate two example implementations of the programmable circuitry 1412 of FIG. 14, many other approaches are contemplated. For example, FPGA circuitry may include an on-board CPU, such as one or more of the example CPU 1620 of FIG. 15. Therefore, the programmable circuitry 1412 of FIG. 14 may also be implemented by combining at least the example microprocessor 1500 of FIG. 15 and the example FPGA circuitry 1600 of FIG. 16. In some such hybrid examples, one or more cores 1502 of FIG. 15 may execute a first portion of the machine-readable instructions represented by the flowchart(s) of FIGS. 11-13 to perform first operation(s)/function(s), the FPGA circuitry 1600 of FIG. 16 may be configured or structured to perform second operation(s)/function(s) corresponding to a second portion of the machine-readable instructions represented by the flowcharts of FIG. 11-13, or an ASIC may be configured or structured to perform third operation(s)/function(s) corresponding to a third portion of the machine-readable instructions represented by the flowcharts of FIGS. 11-13.

Some or all of the circuitry of FIGS. 7 and 9 may, thus, be instantiated at the same or different times. For example, same or different portion(s) of the microprocessor 1500 of FIG. 15 may be programmed to execute portion(s) of machine-readable instructions at the same or different times. In some examples, same or different portion(s) of the FPGA circuitry 1600 of FIG. 16 may be configured or structured to perform operations/functions corresponding to portion(s) of machine-readable instructions at the same or different times.

In some examples, some or all of the circuitry of FIGS. 7 and 9 may be instantiated, for example, in one or more threads executing concurrently or in series. For example, the microprocessor 1500 of FIG. 15 may execute machine-readable instructions in one or more threads executing concurrently or in series. In some examples, the FPGA circuitry 1600 of FIG. 16 may be configured or structured to carry out operations/functions concurrently or in series. Moreover, in some examples, some or all of the circuitry of FIGS. 7 and 9 may be implemented within one or more virtual machines or containers executing on the microprocessor 1500 of FIG. 15.

In some examples, the programmable circuitry 1412 of FIG. 14 may be in one or more packages. For example, the microprocessor 1500 of FIG. 15 or the FPGA circuitry 1600 of FIG. 16 may be in one or more packages. In some examples, an XPU may be implemented by the programmable circuitry 1412 of FIG. 14, which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "or" when used, for example, in a form such as A, B, or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects or things, the phrase "at least one of A and B" is intended to refer to implementations including any of (1) at least one A, (2) at least one B, or (3) at least one A and at least one B. Similarly, as used herein in the context of describing structures, components, items, objects or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is not feasible or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference or relative movement between those elements unless otherwise indicated. As such, connection references do not necessarily infer that two elements are directly connected or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, or ordering in any way, but are merely used as labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, these descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances or other real world imperfections. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication or indirect communication through one or more intermediary components, and does not require direct physical (e.g., wired) communication or constant communication, but rather also includes selective communication at periodic intervals, scheduled intervals, aperiodic intervals, or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to cause configuration or structuring of the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been described that implement cancellation pulse generation with reduced waveform storage to reduce crests in transmission signals. Described systems, apparatus, articles of manufacture, and methods improve the efficiency of using a computing device by generating multiple cancellation pulses for multiple signal peaks in parallel based on a single reference pulse cancellation waveform stored in memory, thereby having a smaller memory footprint than other cancellation pulse generation techniques. Described systems, apparatus, articles of manufacture, and methods are accordingly directed to one or more improvement(s) in the operation of a machine such as a computer or other electronic or mechanical device.

Further examples and combinations thereof include the following. Example 1 includes an apparatus comprising a first memory storing first subsets of data samples of a single pulse cancellation waveform, a second memory storing second subsets of data samples of the single pulse cancellation waveform, the second subsets including different data samples of the single pulse cancellation waveform than the first subsets, first circuitry coupled to the first memory and to the second memory in parallel, a plurality of buffers, and second circuitry coupled to the plurality of buffers.

Example 2 includes the apparatus of example 1, wherein the first subsets include a first number of consecutive data samples of the single pulse cancellation waveform, the first number based on an oversampling factor associated with the single pulse cancellation waveform, and an initial subset and a next subset of the first subsets are separated by a second number of consecutive data samples of the single pulse cancellation waveform, the second number based on a function of the oversampling factor and a total number of output cancellation pulses capable of being generated.

Example 3 includes the apparatus of example 2, wherein the second subsets include the first number of consecutive data samples of the single pulse cancellation waveform, an initial subset and a next subset of the second subsets are separated by the second number of consecutive data samples of the single pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

Example 4 includes the apparatus of example 1, wherein the first circuitry is configured to obtain first indices corresponding to data samples of the single pulse cancellation waveform to be used to generate a first output cancellation pulse, the first indices based on a location of a first peak of an input signal, access a first data sample from the first memory and a second data sample from the second memory in parallel based on the first indices, the first data sample and the second data sample associated with the first output cancellation pulse, obtain second indices corresponding to data samples of the single pulse cancellation waveform to be used to generate a second output cancellation pulse, the second indices based on a location of a second peak of an input signal, and access a third data sample from the first memory and a fourth data sample from the second memory in parallel based on the second indices, the third data sample and the fourth data sample associated with the second output cancellation pulse.

Example 5 includes the apparatus of example 4, wherein the second circuitry is configured to provide the first data sample and the second data sample to a first buffer, the first buffer associated with the first output cancellation pulse, and provide the third data sample and the fourth data sample to a second buffer, the second buffer associated with the second output cancellation pulse, and further including third circuitry configured to configure the first buffer to output the first data sample and the second data sample sequentially based on a first delay, and configure the second buffer to output the third data sample and the fourth data sample sequentially based on a second delay.

Example 6 includes the apparatus of example 1, wherein the first circuitry is to obtain first indices corresponding to data samples of the single pulse cancellation waveform to be used to generate one or more output cancellation pulses, transform the first indices to second indices, and access a first data sample from the first memory and a second data sample from the second memory in parallel based on the second indices.

Example 7 includes the apparatus of example 5, wherein the first data sample corresponds to a first output cancellation pulse, the second data sample corresponds to a second output cancellation pulse, the second circuitry is configured to provide the first data sample to a first buffer, the first buffer associated with the first output cancellation pulse, and provide the second data sample to a second buffer, the second buffer associated with the second output cancellation pulse, and further including third circuitry configured to configure the first buffer to output the first data sample based on a first delay, and configure the second buffer to output the second data sample on a second delay.

Example 8 includes the apparatus of example 1, further including third circuitry to configure the plurality of buffers with respective output delays.

Example 9 includes a transmitter apparatus comprising a plurality of memories, respective ones of the memories storing respective different subsets of data samples of a single pulse cancellation waveform, crest factory reduction circuitry coupled to the plurality of memories and having an input and an output, and digital pre-distortion corrector circuitry having an input and an output, the input of the digital pre-distortion corrector circuitry coupled to the output of the crest factory reduction circuitry.

Example 10 includes the transmitter apparatus of example 9, wherein the crest factory reduction circuitry is configured to access individual data samples from the respective ones of the memories in parallel, and scale the accessed individual data samples based on corresponding cancellation phasors to generate one or more output cancellation pulses.

Example 11 includes the transmitter apparatus of example 10, wherein the crest factory reduction circuitry is configured to combine the one or more output cancellation pulses to generate an output signal.

Example 12 includes the transmitter apparatus of example 9, wherein the crest factory reduction circuitry is configured to determine indices corresponding to samples of the single pulse cancellation waveform to be used to generate one or more output cancellation pulses, the indices based on one or more locations of one or more peaks of an input signal, and access individual data samples from the respective ones of the memories in parallel based on the indices.

Example 13 includes the transmitter apparatus of example 9, wherein the plurality of memories includes a first memory storing first subsets of data samples of the single pulse cancellation waveform, the first subsets including a first number of consecutive data samples of the single pulse cancellation waveform, the first number based on an oversampling factor associated with the single pulse cancellation waveform, and an initial subset and a next subset of the first subsets are separated by a second number of consecutive data samples of the single pulse cancellation waveform, the second number based on a function of the oversampling factor and a total number of output cancellation pulses capable of being generated.

Example 14 includes the transmitter apparatus of example 13, wherein the plurality of memories includes a second memory storing second subsets of data samples of the single pulse cancellation waveform, the second subsets including the first number of consecutive data samples of the single pulse cancellation waveform, an initial subset and a next subset of the second subsets are separated by the second number of consecutive data samples of the single pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

Example 15 includes the transmitter apparatus of example 9, wherein the transmitter apparatus is included in a base station.

Example 16 includes at least one non-transitory computer-readable medium comprising computer-readable instructions to cause at least one processor circuit to at least obtain indices corresponding to samples of a pulse cancellation waveform to be used to generate one or more output cancellation pulses, the indices based on one or more locations of one or more peaks of an input signal, access individual data samples from respective ones of a plurality of memories in parallel based on the indices, the plurality of memories collectively storing a single instance of the pulse cancellation waveform, respective ones of the memories storing respective different subsets of data samples of a pulse cancellation waveform, the respective ones of the memories having respective storage capacities that are smaller than a total number of samples of the single instance of the pulse cancellation waveform, and generate the one or more output cancellation pulses based on the accessed individual data samples.

Example 17 includes At least one non-transitory computer-readable medium of example 16, wherein the computer-readable instructions are to cause one or more of the at least one processor circuit to access the individual data samples from a number of memories based on a total number of output cancellation pulses capable of being generated, and the respective storage capacities of the memories are based a ratio of the total number of samples of the single instance of the pulse cancellation waveform to the total number of output cancellation pulses capable of being generated.

Example 18 includes the at least one non-transitory computer-readable medium of example 16, wherein the computer-readable instructions are to cause one or more of the at least one processor circuit to access the individual data samples from a first memory storing first subsets of data samples of the single instance of the pulse cancellation waveform, the first subsets including a first number of consecutive data samples of the single instance of the pulse cancellation waveform, the first number based on an oversampling factor associated with the single instance of the pulse cancellation waveform, and an initial subset and a next subset of the first subsets are separated by a second number of consecutive data samples of the single instance of the pulse cancellation waveform, the second number based on a product of the oversampling factor and a total number of output cancellation pulses capable of being generated.

Example 19 includes the at least one non-transitory computer-readable medium of example 18, wherein the computer-readable instructions are to cause one or more of the at least one processor circuit to access the individual data samples from a second memory storing second subsets of data samples of the single instance of the pulse cancellation waveform, the second subsets including the first number of consecutive data samples of the single instance of the pulse cancellation waveform, an initial subset and a next subset of the second subsets are separated by the second number of consecutive data samples of the single instance of the pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

Example 20 includes the at least one non-transitory computer-readable medium of example 16, wherein to generate one or more output cancellation pulses, the computer-readable instructions are to cause one or more of the at least one processor circuit to provide the accessed individual data samples to one or more buffers corresponding respectively to the one or more output cancellation pulses, and configure the one or more buffers based on one or more delays to cause the one or more buffers to output the one or more output cancellation pulses to suppress the one or more peaks of the input signal.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

a first memory storing first subsets of data samples of a single pulse cancellation waveform;

a second memory storing second subsets of data samples of the single pulse cancellation waveform, the second subsets including different data samples of the single pulse cancellation waveform than the first subsets;

first circuitry coupled to the first memory and to the second memory in parallel;

a plurality of buffers; and second circuitry coupled to the plurality of buffers.

2. The apparatus of claim 1, wherein the first subsets include a first number of consecutive data samples of the single pulse cancellation waveform, the first number based on an oversampling factor associated with the single pulse cancellation waveform, and an initial subset and a next subset of the first subsets are separated by a second number of consecutive data samples of the single pulse cancellation waveform, the second number based on a function of the oversampling factor and a total number of output cancellation pulses capable of being generated.

3. The apparatus of claim 2, wherein the second subsets include the first number of consecutive data samples of the single pulse cancellation waveform, an initial subset and a next subset of the second subsets are separated by the second number of consecutive data samples of the single pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

4. The apparatus of claim 1, wherein the first circuitry is configured to:

obtain first indices corresponding to data samples of the single pulse cancellation waveform to be used to generate a first output cancellation pulse, the first indices based on a location of a first peak of an input signal;

access a first data sample from the first memory and a second data sample from the second memory in parallel based on the first indices, the first data sample and the second data sample associated with the first output cancellation pulse;

obtain second indices corresponding to data samples of the single pulse cancellation waveform to be used to generate a second output cancellation pulse, the second indices based on a location of a second peak of an input signal; and access a third data sample from the first memory and a fourth data sample from the second memory in parallel based on the second indices, the third data sample and the fourth data sample associated with the second output cancellation pulse.

5. The apparatus of claim 4, wherein the second circuitry is configured to:

provide the first data sample and the second data sample to a first buffer, the first buffer associated with the first output cancellation pulse; and provide the third data sample and the fourth data sample to a second buffer, the second buffer associated with the second output cancellation pulse; and further including third circuitry configured to:

configure the first buffer to output the first data sample and the second data sample sequentially based on a first delay; and configure the second buffer to output the third data sample and the fourth data sample sequentially based on a second delay.

6. The apparatus of claim 5, wherein the first data sample corresponds to a first output cancellation pulse, the second data sample corresponds to a second output cancellation pulse, the second circuitry is configured to:

provide the first data sample to a first buffer, the first buffer associated with the first output cancellation pulse; and provide the second data sample to a second buffer, the second buffer associated with the second output cancellation pulse; and further including third circuitry configured to:

configure the first buffer to output the first data sample based on a first delay; and configure the second buffer to output the second data sample on a second delay.

7. The apparatus of claim 1, wherein the first circuitry is to:

obtain first indices corresponding to data samples of the single pulse cancellation waveform to be used to generate one or more output cancellation pulses;

transform the first indices to second indices; and access a first data sample from the first memory and a second data sample from the second memory in parallel based on the second indices.

8. The apparatus of claim 1, further including third circuitry to configure the plurality of buffers with respective output delays.

9. A transmitter apparatus comprising:

a plurality of memories, respective ones of the memories storing respective different subsets of data samples of a single pulse cancellation waveform;

crest factor reduction circuitry coupled to the plurality of memories and having an input and an output, the crest factor reduction circuitry configured to access individual data samples from the respective ones of the memories in parallel; and digital pre-distortion corrector circuitry having an input and an output, the input of the digital pre-distortion corrector circuitry coupled to the output of the crest factor reduction circuitry.

10. The transmitter apparatus of claim 9, wherein the crest factor reduction circuitry is configured to:

scale the accessed individual data samples based on corresponding cancellation phasors to generate one or more output cancellation pulses.

11. The transmitter apparatus of claim 10, wherein the crest factor reduction circuitry is configured to combine the one or more output cancellation pulses to generate an output signal.

12. The transmitter apparatus of claim 9, wherein the crest factor reduction circuitry is configured to:

determine indices corresponding to samples of the single pulse cancellation waveform to be used to generate one or more output cancellation pulses, the indices based on one or more locations of one or more peaks of an input signal; and access the individual data samples from the respective ones of the memories in parallel based on the indices.

13. The transmitter apparatus of claim 9, wherein the plurality of memories includes a first memory storing first subsets of data samples of the single pulse cancellation waveform, the first subsets including a first number of consecutive data samples of the single pulse cancellation waveform, the first number based on an oversampling factor associated with the single pulse cancellation waveform, and an initial subset and a next subset of the first subsets are separated by a second number of consecutive data samples of the single pulse cancellation waveform, the second number based on a function of the oversampling factor and a total number of output cancellation pulses capable of being generated.

14. The transmitter apparatus of claim 13, wherein the plurality of memories includes a second memory storing second subsets of data samples of the single pulse cancellation waveform, the second subsets including the first number of consecutive data samples of the single pulse cancellation waveform, an initial subset and a next subset of the second subsets are separated by the second number of consecutive data samples of the single pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

15. The transmitter apparatus of claim 9, wherein the transmitter apparatus is included in a base station.

16. At least one non-transitory computer-readable medium comprising computer-readable instructions to cause at least one processor circuit to at least:

obtain indices corresponding to samples of a pulse cancellation waveform to be used to generate one or more output cancellation pulses, the indices based on one or more locations of one or more peaks of an input signal;

access individual data samples from respective ones of a plurality of memories in parallel based on the indices, the plurality of memories collectively storing a single instance of the pulse cancellation waveform, respective ones of the memories storing respective different subsets of data samples of a pulse cancellation waveform, the respective ones of the memories having respective storage capacities that are smaller than a total number of samples of the single instance of the pulse cancellation waveform; and generate the one or more output cancellation pulses based on the accessed individual data samples.

17. At least one non-transitory computer-readable medium of claim 16, wherein the computer-readable instructions are to cause one or more of the at least one processor circuit to access the individual data samples from a number of memories based on a total number of output cancellation pulses capable of being generated, and the respective storage capacities of the memories are based a ratio of the total number of samples of the single instance of the pulse cancellation waveform to the total number of output cancellation pulses capable of being generated.

18. The at least one non-transitory computer-readable medium of claim 16, wherein the computer-readable instructions are to cause one or more of the at least one processor circuit to access the individual data samples from a first memory storing first subsets of data samples of the single instance of the pulse cancellation waveform, the first subsets including a first number of consecutive data samples of the single instance of the pulse cancellation waveform, the first number based on an oversampling factor associated with the single instance of the pulse cancellation waveform, and an initial subset and a next subset of the first subsets are separated by a second number of consecutive data samples of the single instance of the pulse cancellation waveform, the second number based on a product of the oversampling factor and a total number of output cancellation pulses capable of being generated.

19. The at least one non-transitory computer-readable medium of claim 18, wherein the computer-readable instructions are to cause one or more of the at least one processor circuit to access the individual data samples from a second memory storing second subsets of data samples of the single instance of the pulse cancellation waveform, the second subsets including the first number of consecutive data samples of the single instance of the pulse cancellation waveform, an initial subset and a next subset of the second subsets are separated by the second number of consecutive data samples of the single instance of the pulse cancellation waveform, the second subsets include different data samples of the single pulse cancellation waveform than the first subsets, and the initial subset of the second subsets includes the data samples of the single pulse cancellation waveform beginning with a sample index corresponding to the oversampling factor.

20. The at least one non-transitory computer-readable medium of claim 16, wherein to generate one or more output cancellation pulses, the computer-readable instructions are to cause one or more of the at least one processor circuit to:

provide the accessed individual data samples to one or more buffers corresponding respectively to the one or more output cancellation pulses; and configure the one or more buffers based on one or more delays to cause the one or more buffers to output the one or more output cancellation pulses to suppress the one or more peaks of the input signal.

* * * * *